United States Patent [19]
Suemoto et al.

[11] Patent Number: 5,992,743
[45] Date of Patent: Nov. 30, 1999

[54] FILM SCANNER AND METHOD OF READING OPTICAL INFORMATION USING SAME

[75] Inventors: Kazunori Suemoto; Seisuke Muroki; Hideaki Ogawa; Keiji Tsubota, all of Asaka, Japan

[73] Assignee: Fuji Photo Film Co., Ltd., Kanagawa, Japan

[21] Appl. No.: 08/839,367

[22] Filed: Apr. 18, 1997

[30] Foreign Application Priority Data

Apr. 19, 1996 [JP] Japan .................................. 8-098665
Apr. 19, 1996 [JP] Japan .................................. 8-120779

[51] Int. Cl.⁶ .............................. G03B 21/00; H04N 3/36
[52] U.S. Cl. ..................... 235/462.05; 235/475; 396/406
[58] Field of Search ................................... 235/454, 462, 235/462.05, 375; 353/264; 396/389, 406, 409, 410

[56] References Cited

U.S. PATENT DOCUMENTS

| | | | |
|---|---|---|---|
| 4,918,848 | 4/1990 | Ujiie et al. ................................. | 355/41 |
| 5,122,645 | 6/1992 | Saeki et al. ............................... | 235/462 |
| 5,264,682 | 11/1993 | Yoshikawa ............................... | 235/375 |
| 5,317,139 | 5/1994 | Evans et al. ............................. | 235/462 |
| 5,448,049 | 9/1995 | Shafer et al. ............................ | 235/462 |
| 5,665,950 | 9/1997 | Rottner et al. .......................... | 235/375 |
| 5,692,818 | 12/1997 | Kitagawa ................................ | 253/26 A |
| 5,803,565 | 9/1998 | McIntyre et al. ....................... | 353/26 R |

FOREIGN PATENT DOCUMENTS

| | | |
|---|---|---|
| 0331048A2 | 9/1989 | European Pat. Off. . |
| 0658801A1 | 6/1995 | European Pat. Off. . |
| 0668531A1 | 8/1995 | European Pat. Off. . |
| 0675392A2 | 10/1995 | European Pat. Off. . |
| 0677770A1 | 10/1995 | European Pat. Off. . |
| WO 8303513 | 10/1983 | WIPO . |

Primary Examiner—Donald Hajec
Assistant Examiner—Dreg A. Dunn

[57] ABSTRACT

An APS (Advanced Photo System) film of new type has a plurality of image recording areas along the center thereof, a first longitudinal side edge of the film is formed to have perforations corresponding to the image recording areas, and a second longitudinal side edge of the film is formed to have optical information recording areas corresponding to the image recording areas. While the APS film is being conveyed in its longitudinal direction the perforations are sensed and optical information in the optical information recording areas is read with the sensed perforations serving as a reference.

16 Claims, 22 Drawing Sheets

FILM SCANNER AND METHOD OF READING OPTICAL INFORMATION USING SAME

BACKGROUND OF THE INVENTION

1. Field of the Invention

This invention relates to a film scanner for reading images that have been recorded on photographic film.

2. Description of the Related Art

APS (Advanced Photo System) film has been proposed as photographic film in accordance with a new standard. In addition to areas in which images are recorded, APS film is further provided with areas for recording magnetic information and areas for recording optical information. The information recorded in these areas includes information relating to the film, such as film ID, information relating to each frame, such as the frame number, information for printing, such as aspect ratio, and information relating to other aspects of photography.

A film scanner reads the image information that has been recorded on the photographic film, thereby obtaining image data used to display or print the images. The magnetic information and optical information is required to execute image display and/or print processing.

Film scanners may be considered to be of two types. One is of the flat-bed type, in which the image information on the film is read with the film held at rest. The other is of the conveyance type, in which the image information is read from the film while the film is conveyed.

With the film scanner of the latter type, control of the timing at which the magnetic information and optical information recorded on the film is read is of great importance.

SUMMARY OF THE INVENTION

An object of the present invention is to provide a reading method and a film scanner which make it possible to read correctly the optical information that has been recorded on the photographic film while the film is conveyed.

The photographic film is formed to have perforations along a first longitudinal side edge thereof and is provided with optical information recording areas along a second longitudinal side edge thereof. The perforations and the optical information recording areas are disposed so as to correspond to the image recording area of each frame of the film.

A method of reading optical information according to the present invention comprises steps of sensing an edge of a perforation by a perforation sensor, measuring a conveyance distance of the photographic film using as a reference the sensing of the edge of a perforation that corresponds to a frame or the edge of a perforation that corresponds to a neighboring frame, and starting reading of the optical information by a light sensor, photo sensor or optical sensor when the conveyance distance has attained a predetermined first value, and ending reading of the optical information when the conveyance distance has attained a second predetermined value.

A film scanner according to the present invention comprises a film conveyance device for conveying the photographic film longitudinally thereof, a perforation sensor for sensing edges of perforations of the photographic film being conveyed by the film conveyance device, a photo sensor for outputting a signal having a level that corresponds to information that has been recorded on the optical information recording areas, distance measuring means for measuring conveyance distance of the photographic film by the film conveyance device, and optical information reading control means responsive to sensing, by the perforation sensor, of the edge of a perforation that corresponds to a frame or the edge of a perforation that corresponds to a neighboring frame for causing the distance measuring means to measure conveyance distance from the edge, and starting acquisition of an output signal from the photo sensor when the conveyance distance measured has attained a first value and ending acquisition of the output signal from the photo sensor when the conveyance distance measured has attained a second value.

The optical information can be read while the photographic film is conveyed in a forward direction that is accordance with the sequence of the frame numbers, or the optical information can be read while the photographic film is conveyed in the reverse direction.

In accordance with the invention, recording areas of optical information to be read are decided and read timing is controlled, while the photographic film is conveyed in one direction, using the positions of sensed perforations as a reference.

Since the positional relationship between the optical information recording areas and the perforations on the photographic film is predetermined, the correct timing for reading the optical information can be decided by measuring the conveyance distance of the photographic film using the sensed positions of the perforations as a reference. As a result, the optical information can be read accurately while the photographic film is conveyed in one direction.

In accordance with the invention, it is also possible to read optical information that has been recorded on an end of the film that is forward of the image recording area of the first frame.

When optical information that has been recorded on the end of the film forward of the image recording area of the first frame is read while the photographic film is conveyed in the forward direction, control is performed in the following manner:

The photographic film is conveyed in a forward direction that agrees with the sequence of the frame numbers. In response to sensing of a perforation that corresponds to the first frame, the photographic film is conveyed a prescribed distance in the reverse direction. Then, while the photographic film is conveyed again in the forward direction, the optical information in an optical information recording area provided ahead of the position of the first frame is read.

When the optical information is read while the photographic film is conveyed in the reverse direction, control is performed in the following manner:

The photographic film is conveyed in a direction which is the reverse of the sequence of frame numbers, and the optical information in an optical information recording area provided ahead of the position of the first frame is read after the optical information that corresponds to the first frame is read.

There are individual differences in the densities of photographic film bases and density differs from one film to another. As a consequence, the optical transmissivity or the optical reflectivity of the film differs from one film to another.

The present invention provides a method and apparatus through which perforations can be sensed correctly at all times regardless of the density of the film base of the photographic film.

In accordance with the invention, the photographic film is conveyed in the forward direction, the output signal level of the perforation sensor is read when the perforation sensor has come face to face with the film base at the distal end of the photographic film, a threshold value for sensing perforations is set based upon the signal level that has been read, and the output signal of the perforation sensor has its level discriminated using the threshold value that has been set.

The threshold value for sensing the perforations changes in dependence upon the density (the optical transmissivity or reflectivity) of the film base. As a result, the positions of the perforations can be sensed correctly regardless of the density possessed by the photographic film.

Each optical information recording area of the photographic film includes, in accordance with the specifications, a first area in which optical information is recorded in a film manufacturing process and a second area in which optical information is recorded inside the camera, and the first and second areas are disposed longitudinally of the film.

In accordance with the invention, the optical information in the first area and the optical information in the second area differentiated from each other when read. More specifically, leading and trailing ends of the first and second areas are decided by conveyance distance of the film using an edge of a perforation as a reference. As a result, reading of the optical information in the first and second areas is possible using a single photo sensor.

Since the light source for recording the optical information in the first area and the light source for recording the optical information in the second area generally differ, there are instances where the density of these items of optical information differ. Consequently, it is better to make the reading method or the information identifying method associated with the first area different from that associated with the second area.

In a case where the optical information recorded in the first area includes a prescribed pattern provided at a prescribed position, an embodiment of the present invention is such that a threshold value is decided based upon the level of a signal output by the photo sensor when the prescribed pattern is scanned by the photo sensor, the threshold value being for the purpose of discriminating the level of a signal obtained from another portion of the optical information.

As a result, the optical information in the first area can be read correctly without being influenced by the density of the film base or soiling of the film.

In accordance with another embodiment of the invention, the optical information in the second area is discriminated based upon a positive- or negative-going slope of the signal output by the photo sensor when the second area is scanned by the photo sensor.

A certain type of optical information is represented by a clock code string and a data code string which are mutually parallel. In regard to optical information of this kind, inflection points of an output signal from a photo sensor which scans the clock code string are sensed and the level of the output signal of a photo sensor which scans the data code string is read at the timing of the sensed inflection points.

As a result, data represented by a data code string can be read correctly at a clock timing represented by a clock code string.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17a and FIG. 17b are useful in describing the timing at which optical information on APS film used in the film unit equipped with a lens is read, in which FIG. 17a illustrates ordinary APS film and FIG. 17b APS film for the film unit equipped with the lens;

DESCRIPTION OF THE PREFERRED EMBODIMENTS

Figure 1:
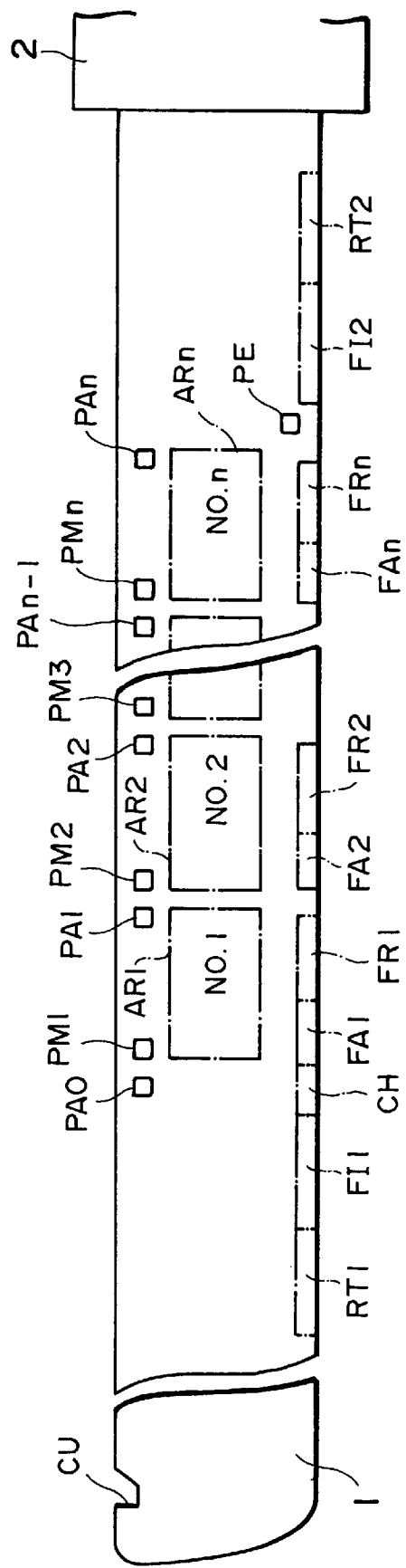
FIG. 1 illustrates the basic constitution of APS film.

FIG. 1 illustrates the basic constitution of a new type of film, namely the film of an APS (Advanced Photo System).

APS film 1 has one end thereof fixed to a spool (not shown) provided in a cartridge 2 in a freely rotatable manner. FIG. 1 shows the APS film 1 in a state in which it has been pulled out of the cartridge 2. The view of FIG. 1 is as seen when the film is viewed from its back side (the side lacking the photosensitive emulsion).

The distal end of the APS film 1 has a cut-out CU on one, i.e., a first, longitudinal side edge. Areas AR (AR1~ARn) for recording images are provided along the entire length of the film 1 with the exception of portions of suitable lengths at the ends of the film. Perforations PM, PA (PM1~PMn, PA0~PAn) are formed along the first longitudinal side edge of the APS film.

The image recording area AR is the maximum area exposed when a picture is taken by the camera and may be referred to as an "exposed image area". An area to be e.g. displayed or printed is provided within the exposed image area AR. (This smaller area, the size of which is specified by a FAT code, described later, may be referred to as a "printed image area" or a "projected image area". An H image area is illustrated as one example thereof in FIG. 5.) The perforations PM and PA are located at positions corresponding to the leading and trailing edges, respectively, of each exposed image area AR and stipulate each area. The perforation at the leading edge of area AR is referred to as an "M" (metering) perforation and the perforation at the trailing edge of the area AR is referred to as an "A" (anticipation) perforation. The perforation PA0 is formed forward of the perforation MP1, which is located at the leading edge of the first frame (Frame No. 1).

An end perforation PE is formed rearward of the area ARn of the last frame (Frame No. n) on the longitudinal side edge (referred to as "the other side edge") of the APS film 1 opposite that on which the perforations PA0~PAn are formed.

The optical information recorded on the APS film 1 will now be described.

A FAT [or PAR (Print Aspect Ratio)] bit area FA (FA1~FAn) and a frame bar-code area FR (FR1~FRn) are provided on the side of the exposed image area AR opposite the perforations PM, PA.

Figure 2:
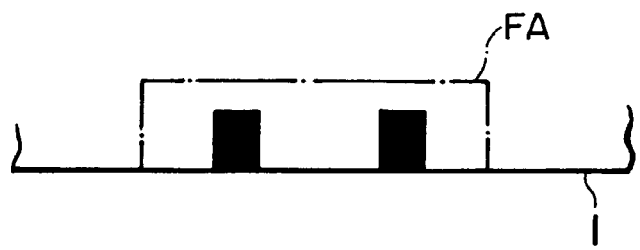
FIG. 2 illustrates an example of FAT bits recorded in a FAT bit area.

A FAT bit represents the aspect ratio (the ratio of the width to the height of the image) intended by the photographer at the time of photography. The aspect ratio is utilized in print or display processing and the image having this aspect ratio is printed or displayed. For example, there are three types of print formats, namely C (conventional size) [or L (large size)], P (panorama size) and H (high-definition size). FIG. 2 shows an example of a FAT bit representing the C-size print format. The C size is represented by two data bits. The P size is represented by one data bit and the H size is expressed by an absence of data bits.

Figure 3:
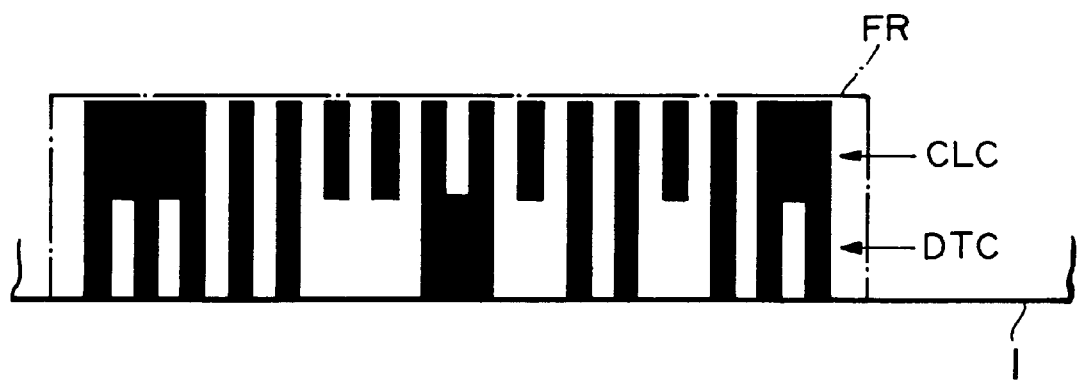
FIG. 3 illustrates an example of a bar code recorded in a frame bar-code area.

A frame bar code, one example of which is shown in FIG. 3, has been recorded in the frame bar-code area FR. The frame bar code comprises a clock code string CLC and a data code string DTC. The maker and/or film type, the frame number, etc., are represented by the data code string DTC. The timing at which data are read is stipulated by the clock code string CLC.

The FAT bit area FA and the frame bar code area FR are provided, for every frame, along the other side edge of the APS film 1. The leader of the APS film 1 (namely the end portion of the film that is forward of the exposed image areas AR) is provided with a Lot. No. bar-code area RT1, a film ID bar-code area FI1 and a CHOL area CH, in the order mentioned, along the other side edge of the film. The trailer of the APS film 1 (namely the end portion of the film that is rearward of the exposed image areas AR) (the portion that follows the end perforation PE) is provided with a film ID bar-code area FI2 and a Lot. No. bar-code area RT2, in the order mentioned, along the other side edge of the film. The two bar-code areas RT1, FI1 of the leader are arranged symmetrically with respect to the two bar-code areas FI2, RT2 of the trailer. Each bar code comprises a clock code string and a data code string in the same manner as the frame bar code FR shown in FIG. 3.

The Lot No. bar code represents the Lot No. of the maker of the APS film. The film ID bar code represents the film ID No. and the film length. Film length is expressed as being of 40 frames, 25 frames and 15 frames, etc., using the number of frames which the film contains.

Figure 4:
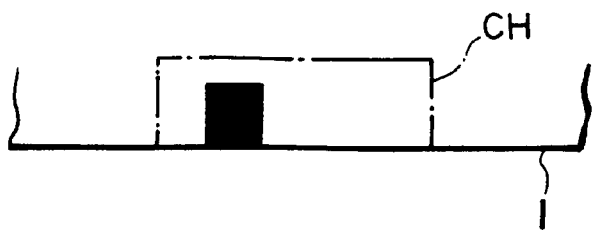
FIG. 4 illustrates an example of a CHOL bit recorded in a CHOL area.

A CHOL bit recorded in the CHOL area CH represents the attitude of the film when the film has been loaded in the camera. The CHOL bit is "1" if the cartridge is on the left side as viewed from the back of the camera, and is "0" if the cartridge is on the right side. The attitude of the film is decided by the camera structure. An example in which the CHOL bit is "1" is illustrated in FIG. 4.

The information recorded in the areas RT1, FI1, CH, FA, FR, FI2 and RT2 is optical information. This information appears when the APS film 1 is developed. The bar codes (see FIG. 3) are recorded in the Lot No. bar-code areas RT1, RT2, the film ID bar-code areas FI1, FI2 and the frame bar-code area FR when the film is manufactured. By contrast, the data bits of the FAT area FA and CHOL area CH (see FIGS. 2 and 4) are recorded by the camera when the camera exposes prescribed patterns using a light source that is built in the camera.

Examples of specific dimensions of each of the areas described above are illustrated in FIGS. 5 through 7. The numerical values are expressed in mm (millimeter) units. The dimensions of each area represent the maximum scope of the area on which the bar codes or data bits are recorded. This scope of the area is not necessarily filled with the recorded bar code or data bits; generally some margin is left on either side.

Examples of the optical information other than that mentioned above include Lot No., Film No., film length (number of frames) and Frame No. recorded using numerals that can be read by an individual. These are provided along the first longitudinal side edge of the APS film 1 at positions corresponding to each of the areas on the opposite side edge.

The APS film 1 has two sides. One side is the surface having the photosensitive emulsion and is the side on which images are formed by photography. The above-mentioned optical information is recorded on the emulsion side of the film. Provided on the other side surface of the film are magnetic recording areas at locations corresponding to the areas RT1, FI1, CH, FA, FR, etc. The magnetic recording areas consist of a magnetic recording layer formed by coating this side surface of the film with a transparent magnetic substance. Information more detailed than the optical information, such as information (CHOL) relating to the attitude of the film, information (PAR) relating to aspect ratio, date of photography, distance to the subject and position of the main subject in the image of one frame, is recorded in the magnetic recording areas.

One characteristic of APS film is that even after being developed, the film is housed in the cartridge 2 in the same manner as before development.

A film scanner conveys the film 1 while pulling the film out of the cartridge 2, reads the optical information and magnetic information, which has been recorded on the film, as well as the images that have been recorded on the film, in the process of conveying the film. The images read are stored in memory as necessary or displayed on a display device or printed. Modes for reading the images that have been recorded in the exposed image areas AR of the film are classified broadly into two types. One is a mode for reading images coarsely. An image that has been read coarsely is used as an index image. Specifically, a number of small or "thumbnail" images are displayed in an array comprising a plurality of vertical columns and a plurality of horizontal rows. In the coarse reading mode, values of shutter speed, brightness and white balance, etc., suited to each image are sensed. The other mode is one in which images are read at a high resolution. The image data obtained are used for display or printing purposes.

Figure 8:
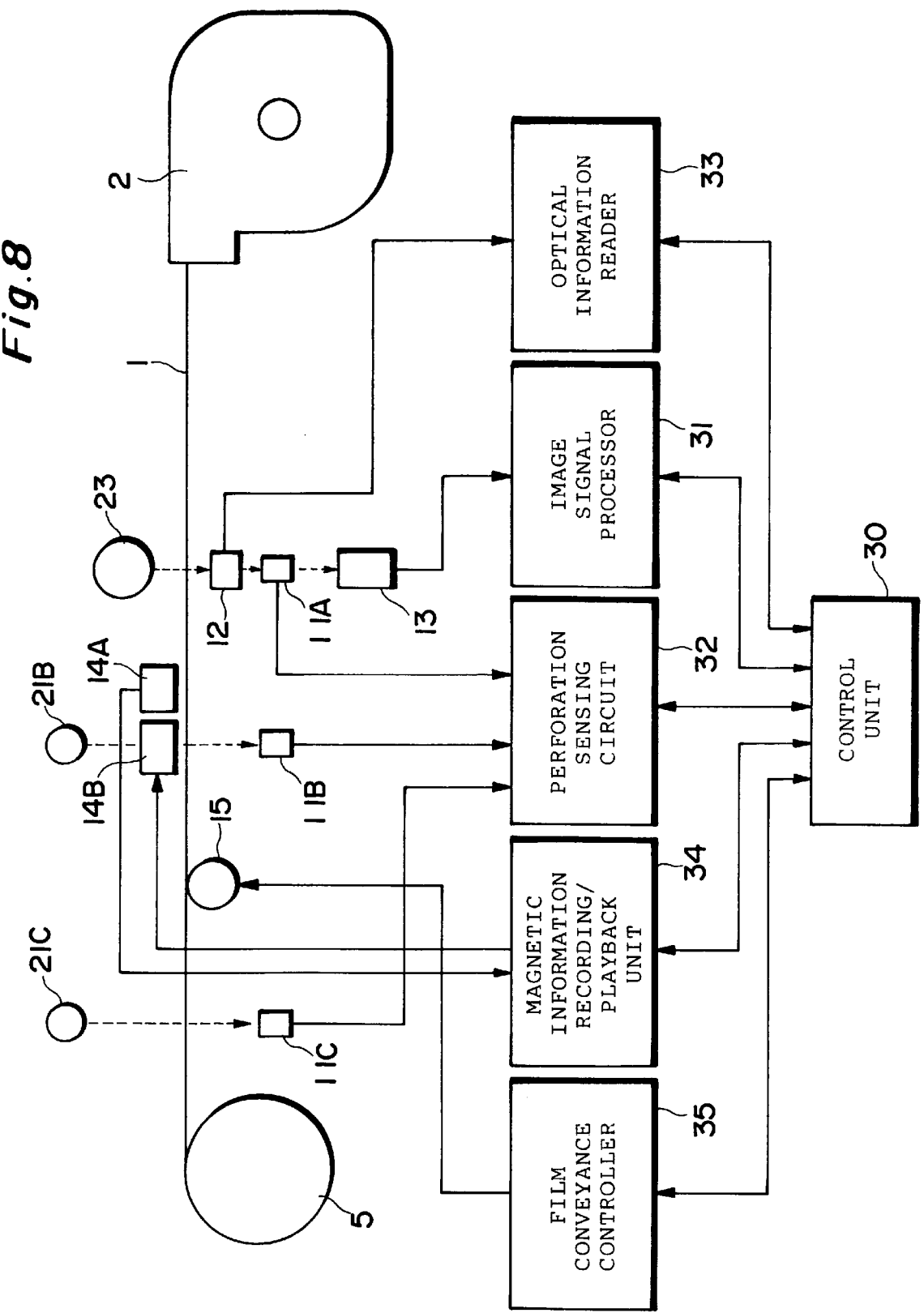
FIG. 8 is a block diagram showing the construction of a film scanner.
Figure 9:
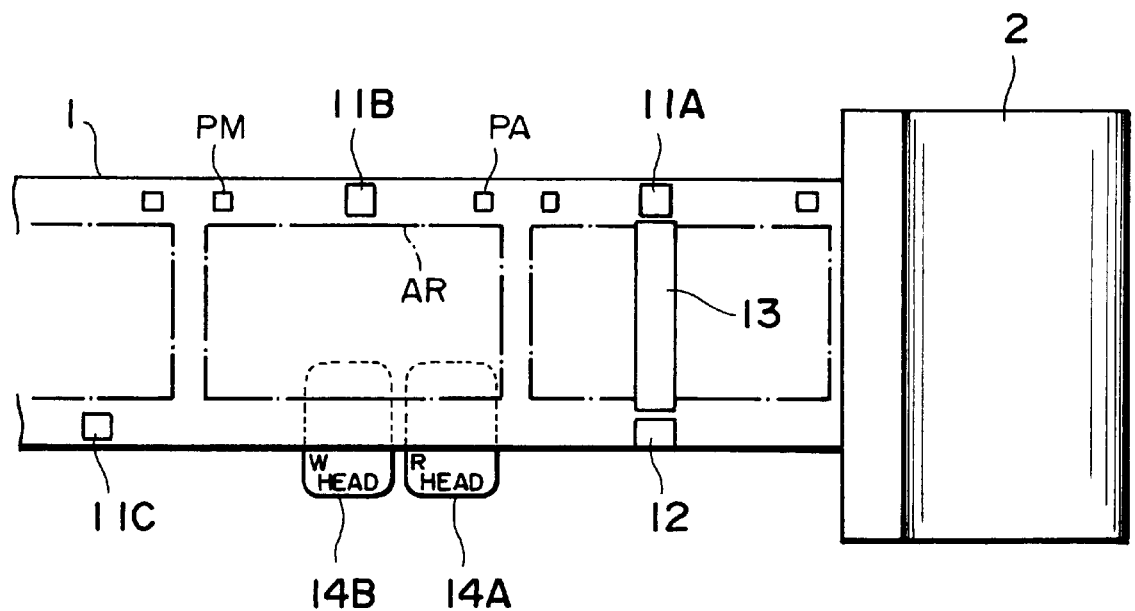
FIG. 9 is a front view of a film conveyance path.
Figure 10:
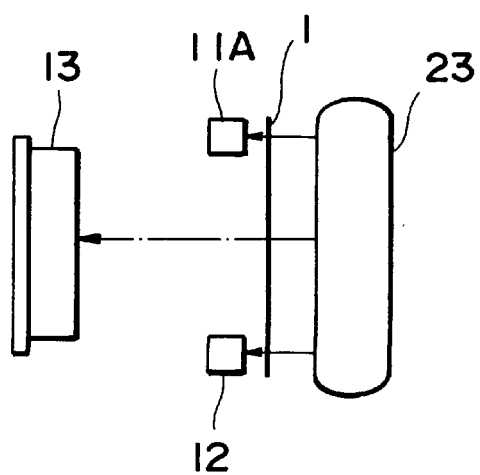
FIG. 10 is a sectional view of the film conveyance path.

FIGS. 8 through 10 illustrate the general construction of a film scanner.

The APS film 1 that has been pulled out of the cartridge 2 is wound up on a take-up shaft 5 via a conveyance path. conveyance or running of the film 1 in the direction from the cartridge 2 to the take-up shaft 5 is referred to as "forward conveyance", and conveyance or running in the opposite direction is referred to as "reverse conveyance". Forward and rearward ends of the film in the conveyence direction are decided using forward conveyance as the reference.

Two perforation sensors 11A and 11B are situated in the film conveyance path at positions by which the first longitudinal side edge of the film 1 passes. The output signal of the perforation sensor (a CCD perforation sensor) 11A is used to decide the timing for reading the images of the exposed image areas AR as well as the optical information of the optical information recording areas RT1, FI1, RT2, FI2, CH, FA and FR. The output signal of the perforation sensor 11B is used to decide timing relating to reading or writing of the magnetic information in the magnetic information recording areas.

An additional perforation sensor 11C is situated at a height traversed by the other side edge of the film 1 and is located forward of the sensors 11A, 11B in terms of the direction of film conveyance. The output signal of the sensor 11C is used to sense completion of film loading, namely that the leading end of the film pulled out of the cartridge 2 has reached this position, and the end perforation PE, namely that the trailing edge of the film has reached this position.

A photo sensor or optical sensor or light sensor 12 for reading the optical information is situated at a height traversed by the optical information recording areas and is located at approximately the same position as the perforation sensor 11A in terms of the conveyance direction.

A CCD line sensor 13 is provided at a position approximately the same as that of the sensors 11A and 12 in terms of the conveyance direction. The CCD line sensor 13 reads the images of the exposed image areas AR of film 1 and includes a number of photoelectric transducers arranged in a row transversely of the film 1.

The photo sensors 11A, 11B, 11C, 12 and 13 are arranged so as to face the photosensitive emulsion side of the conveyed film 1. Light sources 23, 21B and 21C are provided on the side of the film opposite that on which these photo sensors are provided. The light source 23 is elongated in the direction transverse to the film 1. Light from the central portion of the light source 23 passes through the film 1 and impinges upon the CCD line sensor 13 through a lens system (not shown). The light rays from both ends of the light source 23 impinge upon respective ones of the sensors 11A, 12 through both longitudinal side edges (which include the perforations) of the film 1. The light sources 21B, 21C are provided at positions corresponding to the sensors 11B, 11C, respectively.

A magnetic reading head 14A and a magnetic recording head 14B are provided at positions facing the magnetic information recording areas of the film 1.

A video signal output by the CCD line sensor 13 enters an image signal processor 31. The latter executes image signal processing such as white-balance adjustment and gamma correction. The processed video signal is applied to a display device so that the image represented by this signal is displayed.

A perforation sensing circuit 32 subjects the output signals from the perforation sensors 11A, 11B, 11C to processing such as amplification and level discrimination. On the basis of the signal from the photo sensor 12, an optical information reader 33 reads the optical information that has been recorded on the film 1. A magnetic information recording/playback unit 34 processes the read signal from the recording head 14A and, on the basis of data to be written to the magnetic information recording areas of the film 1, produces a write signal and drives the write head 14B.

A film conveyance controller 35 controls a film drive mechanism which includes elements for film drive such as a fork fitted into the spool of the cartridge 2, the take-up shaft 5 and a capstan roller 15. The film drive mechanism includes a drive motor. FG pulses are produced by a pulse generator operatively associated with the drive motor. The controller 35 controls the film conveyance distance (position) and conveyance speed based upon the FG pulses.

A control unit 30, which receives signals from the above-mentioned circuitry and devices 31~35 and controls the circuitry and these devices, includes a CPU and its peripherals. Several examples of control performed by the control unit 30 for the purpose of reading optical information will be described next.

A first example of control involves first conveying the film 1 at high speed in the forward direction and reading magnetic information during high-speed conveyance in the forward direction, then conveying the film 1 at intermediate speed in the reverse direction and performing coarse reading of images and reading of optical information during the intermediate-speed conveyance in the reverse direction.

Figure 11:
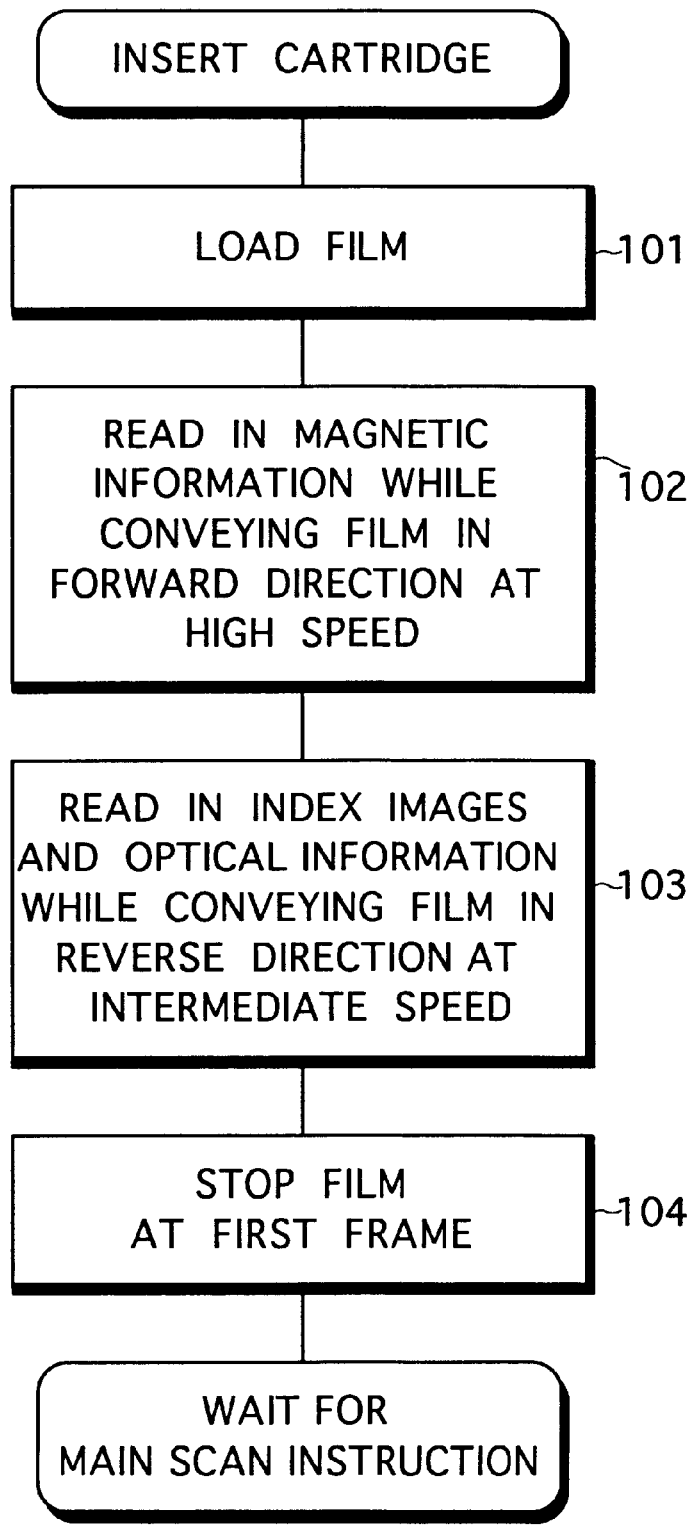
FIG. 11 is a flowchart illustrating the essentials of an operation of a first example in which optical information is read during conveyance in a reverse direction.

The essentials of this control operation will now be described in accordance with the flowchart shown in FIG. 11.

When the film cartridge 2 is inserted into the film scanner, the film 1 is loaded (step 101) and is conveyed from its leading end to its trailing end at high speed in the forward direction. At this time the magnetic information that has been recorded in the magnetic information recording areas is read by the magnetic information recording/playback unit 34 using the reading head 14A (step 102). Reading of the magnetic information requires that the film be conveyed at a high speed greater than a certain speed value.

Next, the images in the exposed image areas AR are read by the CCD line sensor 13, and the resulting video signal is processed by the image signal processor 31, while the film 1 is conveyed in the reverse direction at intermediate speed from its trailing end to the first frame on the side of the leading end. This reading of the images is coarse reading and index images are formed by the video signal obtained. The index images are displayed on a monitor display unit (step 103). Further, the optical information is read by the optical information reader 33 based upon the output from the photo sensor 12 during this reverse conveyance at intermediate speed.

At the moment the reading of images up to the first frame (Frame No. 1) ends (or more precisely, when the reading of the bar codes in areas RT1, FI1 and the reading of the bit of the area CH on the leader of the film 1 is completed), the conveyance of the film 1 is stopped (step 104) and the system waits for a main scan instruction.

To simplify the description, the timings at which the FAT bit of the FAT bit areas FA and the CHOL bit (dot) of the CHOL area in the optical information are read will be discussed.

Figure 12:
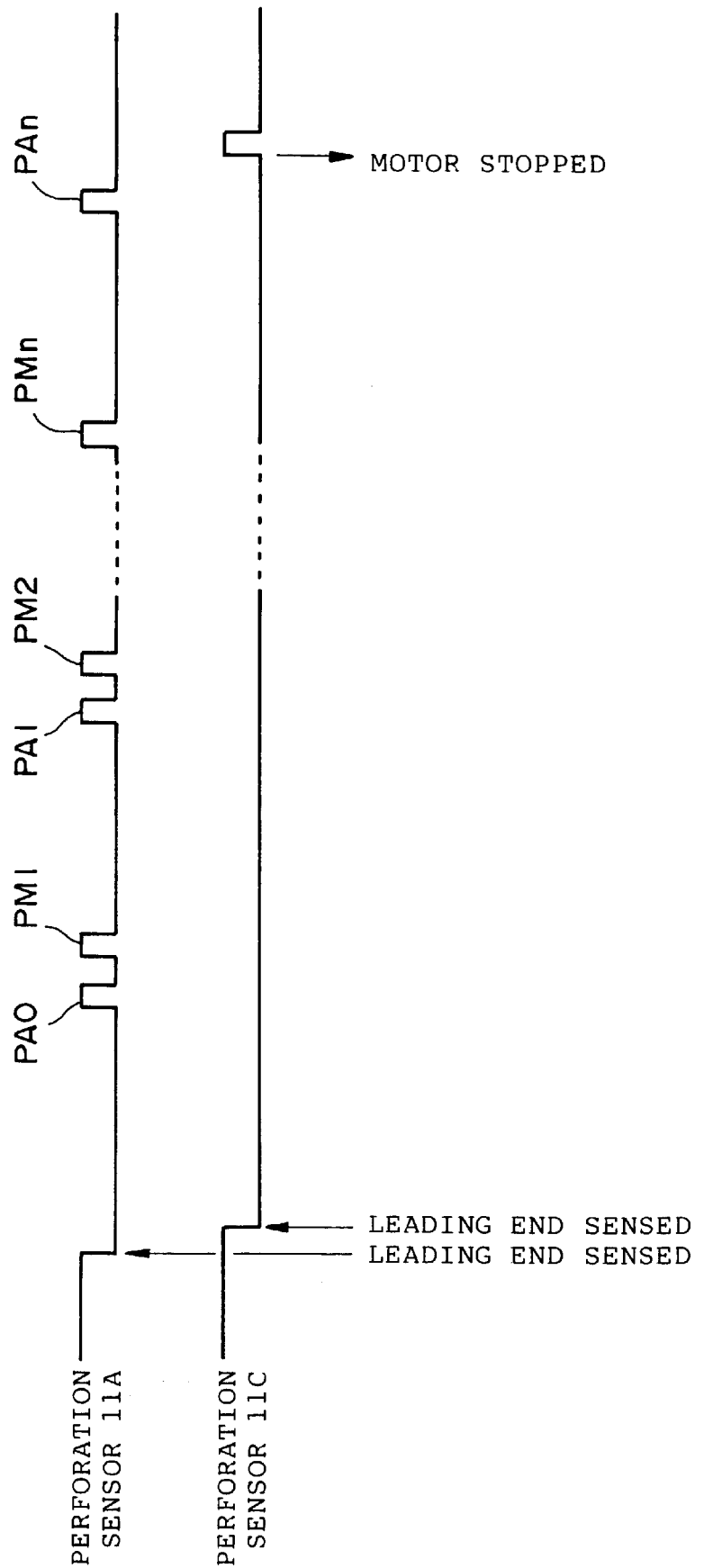
FIG. 12 is a waveform diagram of signals outputted by perforation sensors.

FIG. 12 illustrates the waveforms signals obtained from the perforation sensors 11A and 11C when the film 1 is conveyed. If the film 1 is conveyed between its leading end and its trailing end, the same signals will be obtained regardless of forward conveyance or reverse conveyance.

At step 102 mentioned above, the magnetic information is read while the film is being conveyed in the forward direction at high speed. When the perforation sensor 11C senses the end perforation PE, the control unit 30 halts the travel of the film 1 at this position.

Next, when the film 1 is conveyed in the reverse direction at intermediate speed at step 103, the perforation sensor 11A outputs signals indicative of sensing of the perforations PA and PM. The bits of the FAT bit areas FA and CHOL area CH are read by the photo sensor 12 based upon sensing of the perforations PA, PM.

From the pulse signal that enters from the perforation sensor 11A, the control unit 30 senses the edges representing the trailing ends of the perforations PA. In other words, the leading edges of the odd-numbered pulses are sensed after reverse conveyance of the film 1 is started.

Figure 5:
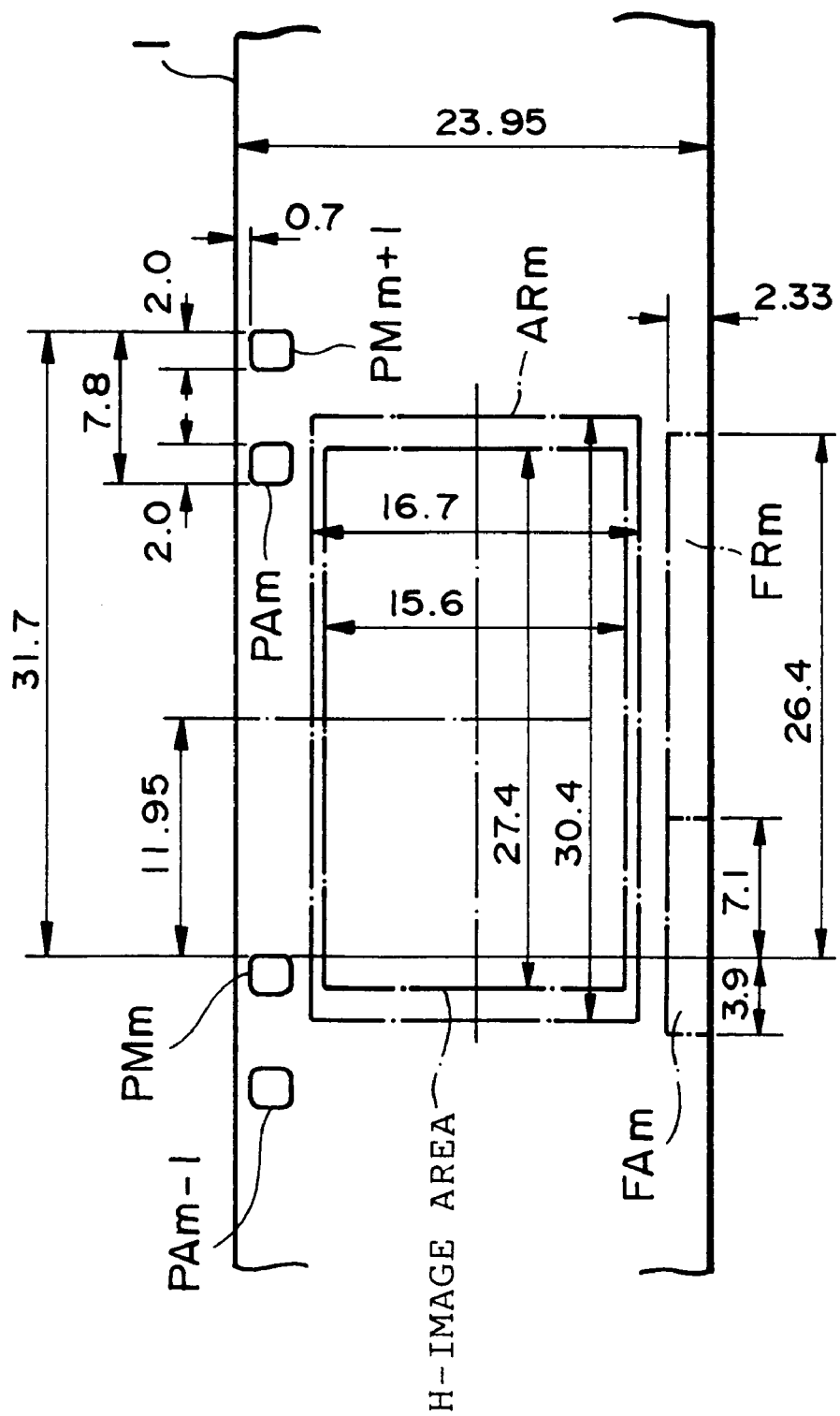
FIGS. 5 through 7 illustrate specific dimensions of each of the areas on the APS film.
Figure 6:
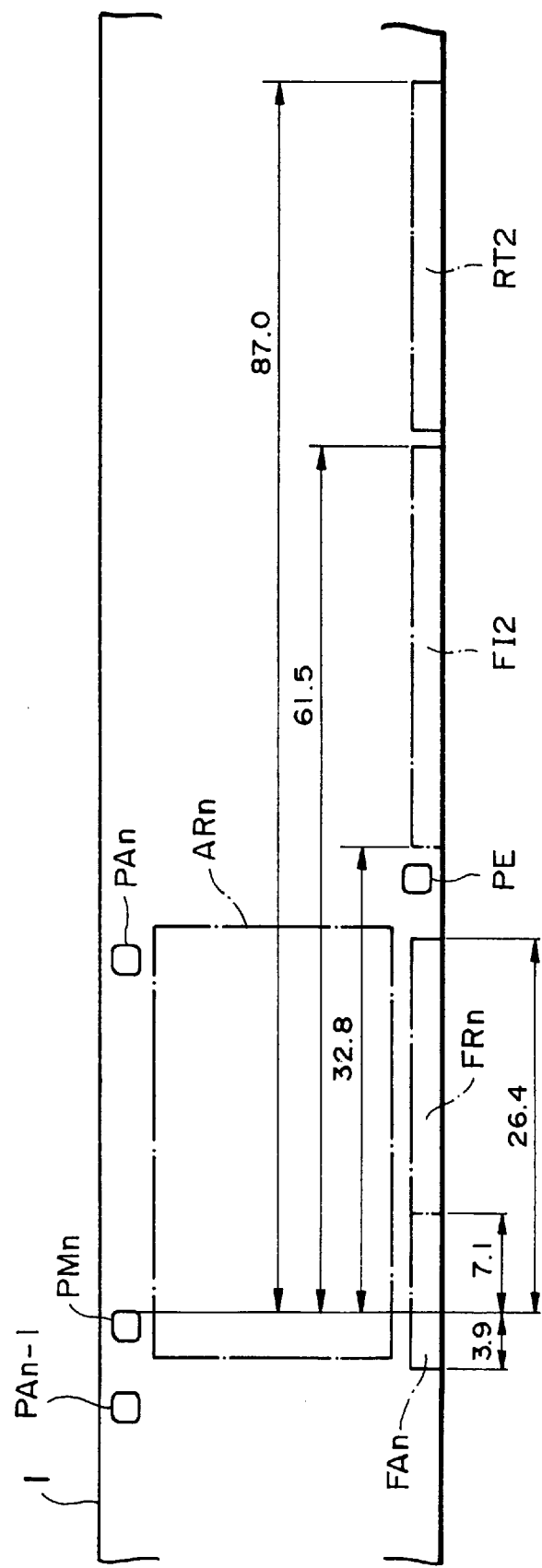
Figure 7:
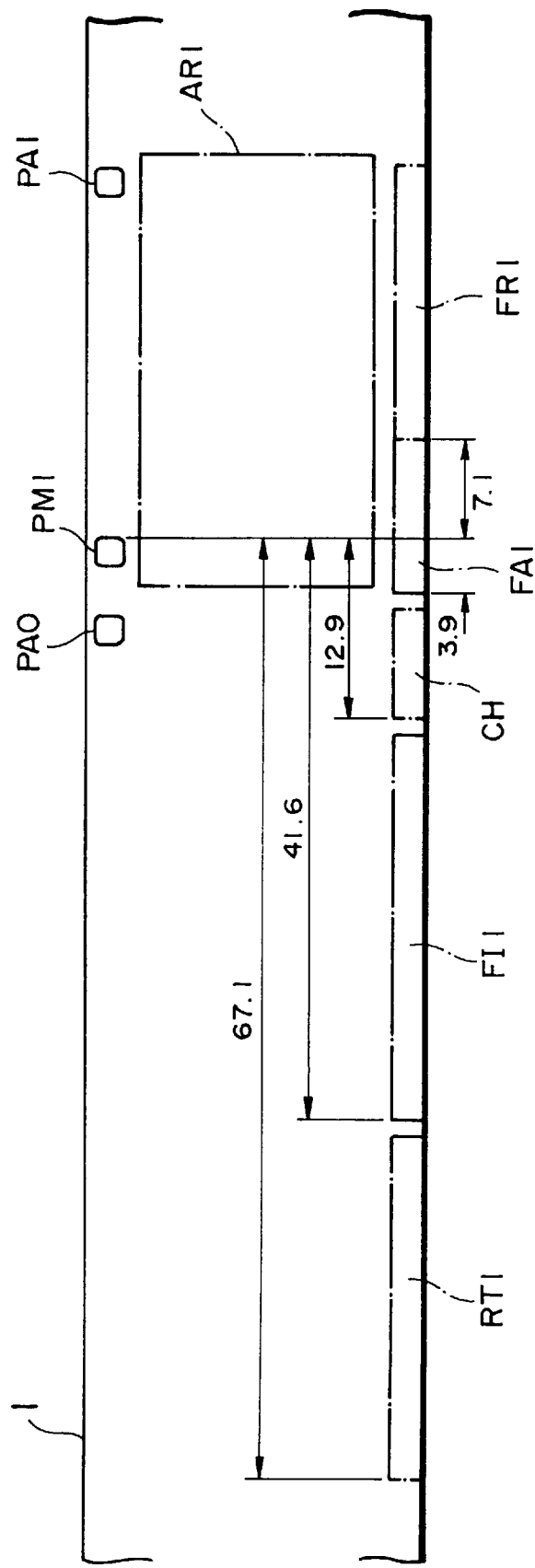
Figure 13:
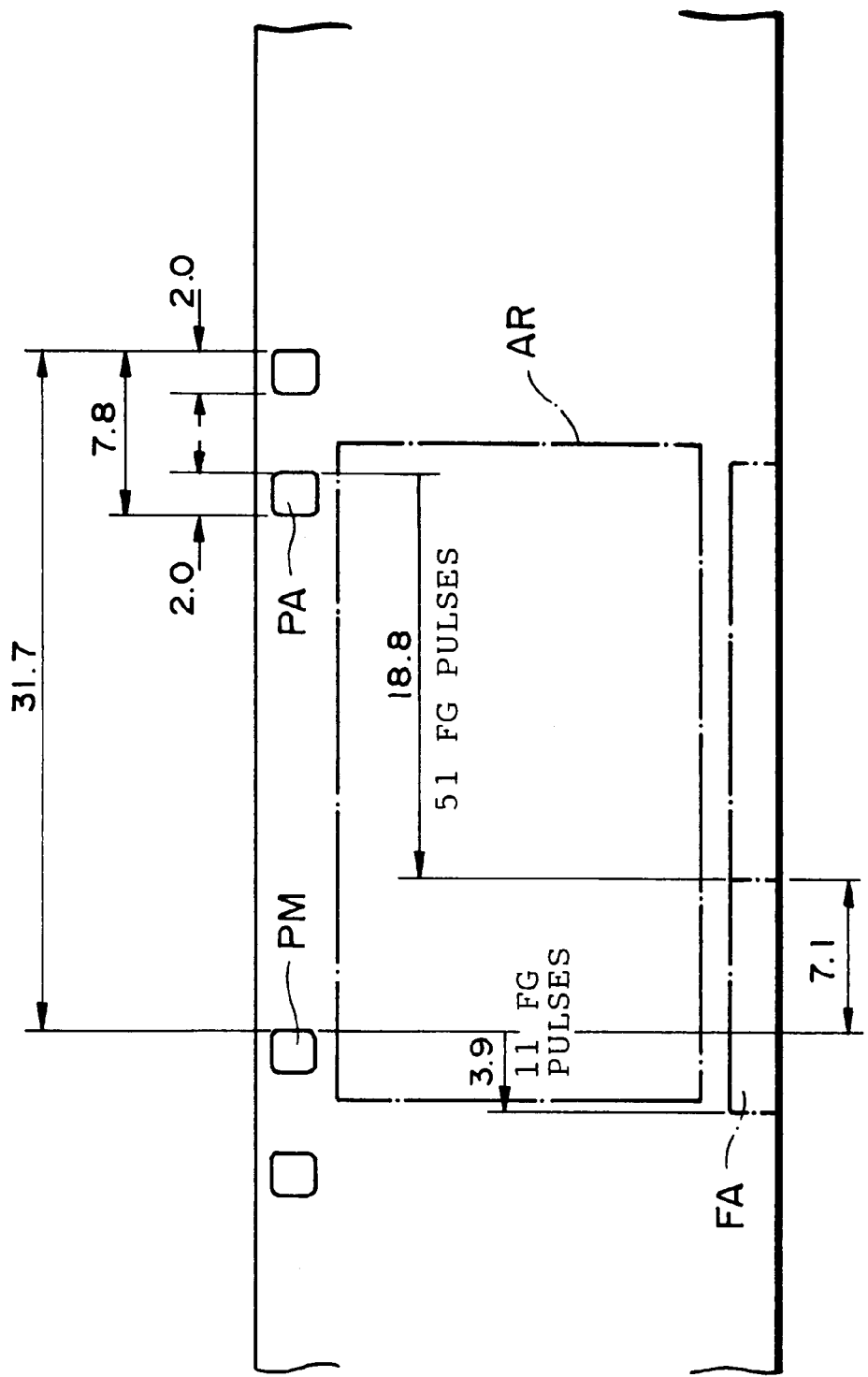
FIGS. 13 and 14 are diagrams useful in describing the timing at which optical information recording areas are read.

In accordance with the specifications of the APS film 1 shown in FIGS. 5 through 7, the distance from the trailing edge of perforation PA to the trailing edge of FAT bit area FA is 18.8 mm, as depicted in FIG. 13. Assume that the FG pulses output by the conveyance controller 35 of the film 1 have a pulse interval which represents 0.36889 mm. If the number of these FG pulses is counted, the conveyance distance of the film 1 will be calculated. If 18.8 mm is calculated in terms of the number of FG pulses, 18.8 mm will be equivalent to 51 pulses.

Accordingly, when the controller 30 has counted 51 of the FG pulses from the moment at which the trailing edge of the perforation PA is sensed, the photo sensor 12 will be opposing the trailing edge of the FAT bit area FA and therefore will start reading the bits of the FAT bit area FA. In other words, capture of the output signal from the photo sensor 12 is started (as by opening a gate, for example).

In FIG. 13 the leading edge of the FAT bit area FA is located at a position that is 3.9 mm from the trailing edge of the perforation PM. This corresponds to 11 of the FG pulses.

The control unit 30 senses the leading edges of the even-numbered pulses from the output signal of the sensor 11A after reverse conveyance of the film 1 is started. When 11 of the FG pulses have been counted starting from the moment at which the leading edge of the pulse signal is sensed, the control unit 30 terminates (as by closing a gate) the reading of the FAT bits by the photo sensor 12.

Thus, the timings at which the reading of the bit data in the FAT bit area FA by the photo sensor 12 is started and stopped are controlled using detection of the perforations as a reference.

Figure 14:
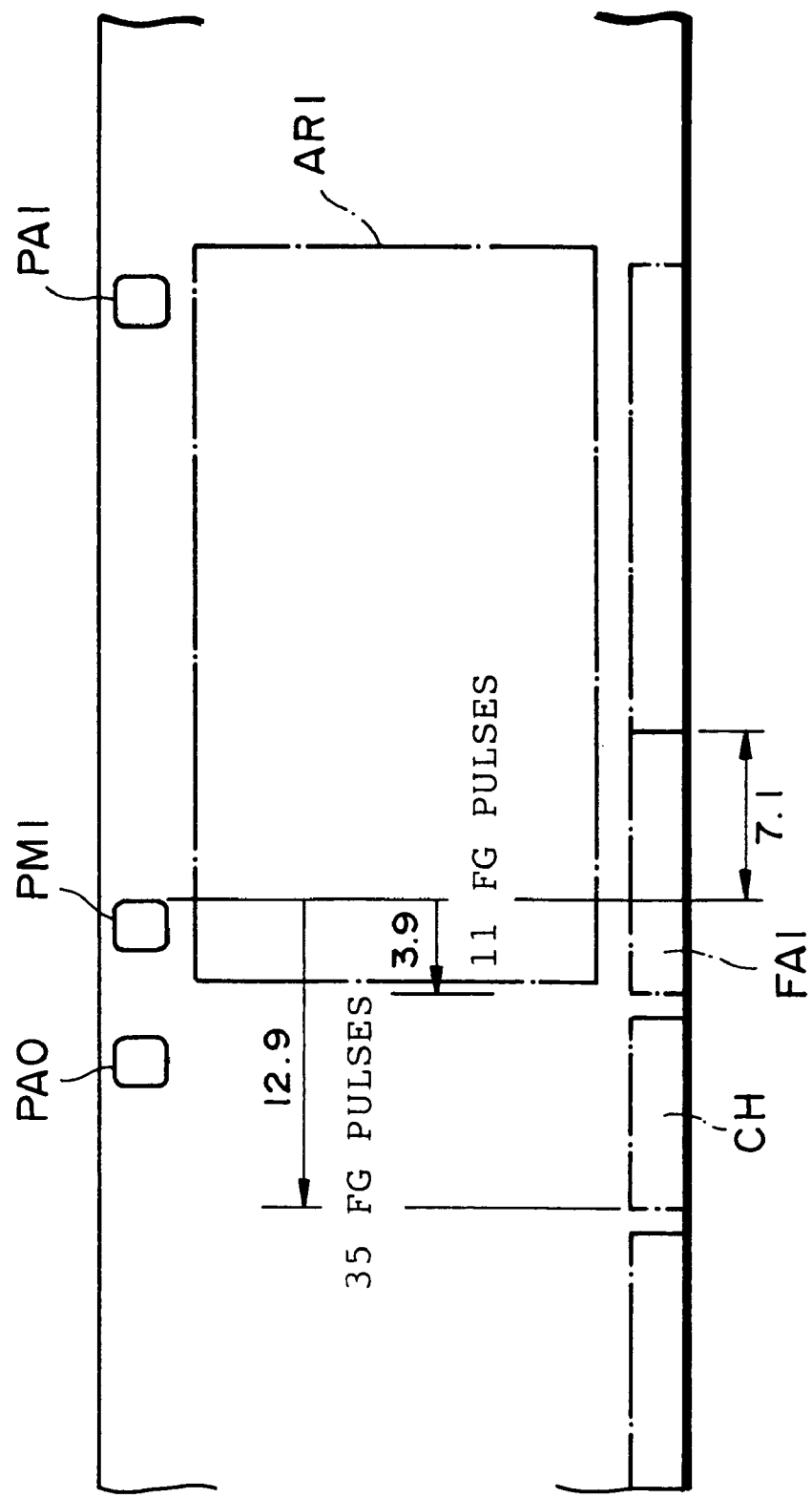

The above-described operation is repeated. When the trailing edge of the perforation PM1 of the first frame is sensed and thereafter 11 FG pulses are counted, the reading of the FAT bit area FA ends and the photo sensor 12 approaches the CHOL area CH. Accordingly, the control unit 30 starts reading the bit data of the CHOL area CH. The leading edge of the CHOL area CH is located at a position that is 12.9 mm from the trailing edge of the perforation PM1 as shown in FIG. 14. This is equivalent to 35 of the FG pulses. The control unit 30 ends the reading of the CHOL area CH when it has counted 35 of the FG pulses following detection of the trailing edge of the perforation PM1.

On the basis of the magnetic information already read, the control unit 30 is capable of ascertaining the number of frames contained in the film 1. Alternatively, if the control unit 30 counts the number of perforations sensed by the perforation sensor 11A at high-speed conveyance of the film in the forward direction, it will be capable of ascertaining the number of frames based upon the count. It is possible for the control unit 30 to sense the perforation PM1 of the first frame during reverse conveyance.

If necessary, the reading of the CHOL area CH can be followed by reading the bar codes of the film ID bar-code area FI1 and the Lot. No. bar-code area RT1 included in the film leader, and the position at which reading ends can also be determined based upon the count of FG pulses.

If, based upon the FG pulses, the film is conveyed further in the forward direction by a length equivalent to the film ID bar-code area FI2 and Lot. No. bar-code area RT2 of the film trailer after the end perforation PE is sensed in forward conveyance, then the areas FI2 and RT2 can be read in subsequent conveyance in the reverse direction.

If the perforations are counted in forward conveyance of the film 1 as set forth above, then data representing the number of frames can be obtained. This means that it is not always necessary to read the bar codes in the frame bar-code areas FR. When reading of a frame bar-code area FR is performed, it will suffice to start reading upon counting, by way of the FG pulses, the distance up to the trailing edge of the frame bar-code area FR in reverse conveyance using as a reference the trailing edge of the perforation PM of one succeeding frame, and end reading upon counting, by way of the FG pulses, the distance up to the leading edge of the frame bar-code area FR using as a reference the trailing edge of the perforation PA of this frame.

In the description given above, the positions at which reading of the FAT bit area FA and CHOL area CH ends are measured from the position at which the trailing edge of the perforation PM is sensed. However, it is permissible to measure from the position at which the trailing edge of the perforation PA is sensed.

When there is a discrepancy, in the conveyance direction, between the position at which the trailing edge of a perforation is sensed by the sensor 11A and the position at which the optical information is read by the photo sensor 12, a pulse count equivalent to this discrepancy and serving as an offset should be added to or subtracted from the count of the FG pulses.

The FAT bit area FA of a frame extends forwardly and rearwardly from the position of the perforation PM of the same frame, as evident from FIG. 5 or 7. Further, the CHOL area CH extends forwardly from the perforation PA0. When the FAT bit area FA and the CHOL area CH are to be optically read using as a reference the perforation PM of the corresponding frame and the preceding perforation PA0, respectively, during forward conveyance of the APS film 1, the film 1 must first be conveyed a prescribed distance in the reverse direction after these perforations are sensed and then the areas FA and CH must be read while conveying the film 1 in the forward direction. In the first example described above, the reading of these areas is carried out in reverse conveyance. Accordingly, the timings for starting and ending reading of the FAT bit area FA can be decided using the perforations PA and PM of the corresponding frame as a reference (see FIG. 13), and the timing for reading the CHOL area CH can be decided using the perforation PM1 of the first frame as a reference (see FIG. 14). After the APS film 1 has been conveyed in the forward direction, it is required that the film always be conveyed in the reverse direction to restore the film to its original state. Operation is efficient since the reading of the optical information is performed utilizing this essential reverse conveyance of the film.

According to the specifications of the APS film described above, the film is used upon being loaded in an ordinary camera. A film unit equipped with a lens is available as one example of a special camera. The film unit is such that photographic film is housed in a case having the shape of a camera, with the case being provided with a lens, a shutter, a film take-up mechanism and, in certain cases, a strobe device. Using APS film in this film unit equipped with a lens has been proposed. Such a configuration shall be referred specifically as "APS film for LF".

Figure 15A:
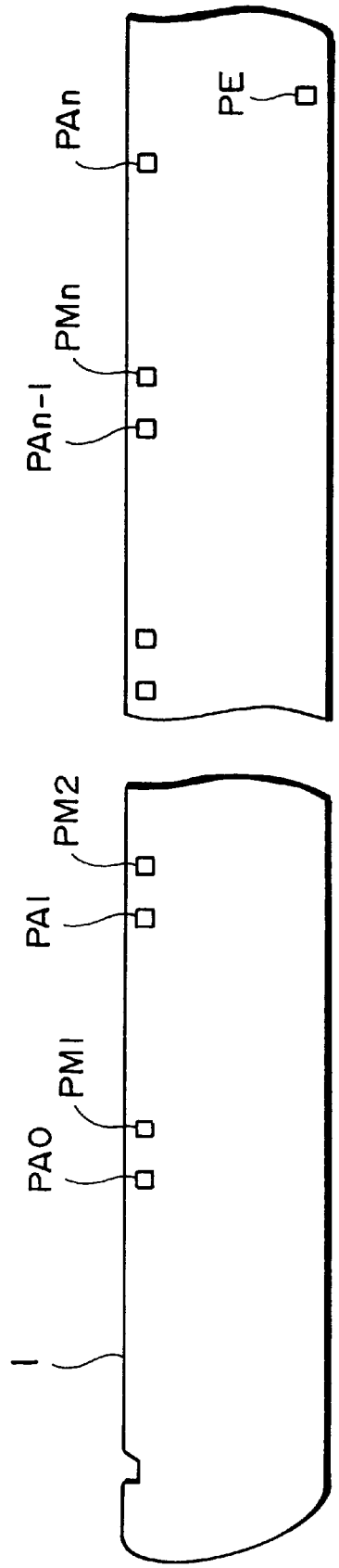
FIG. 15a illustrates ordinary APS film.
Figure 15B:
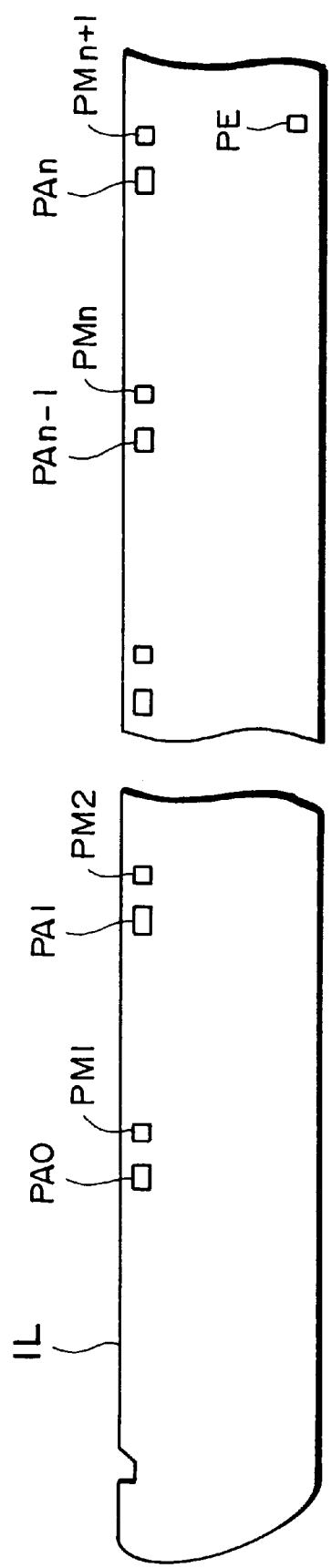
FIG. 15b illustrates APS film used by a film unit equipped with a lens.
Figure 16:
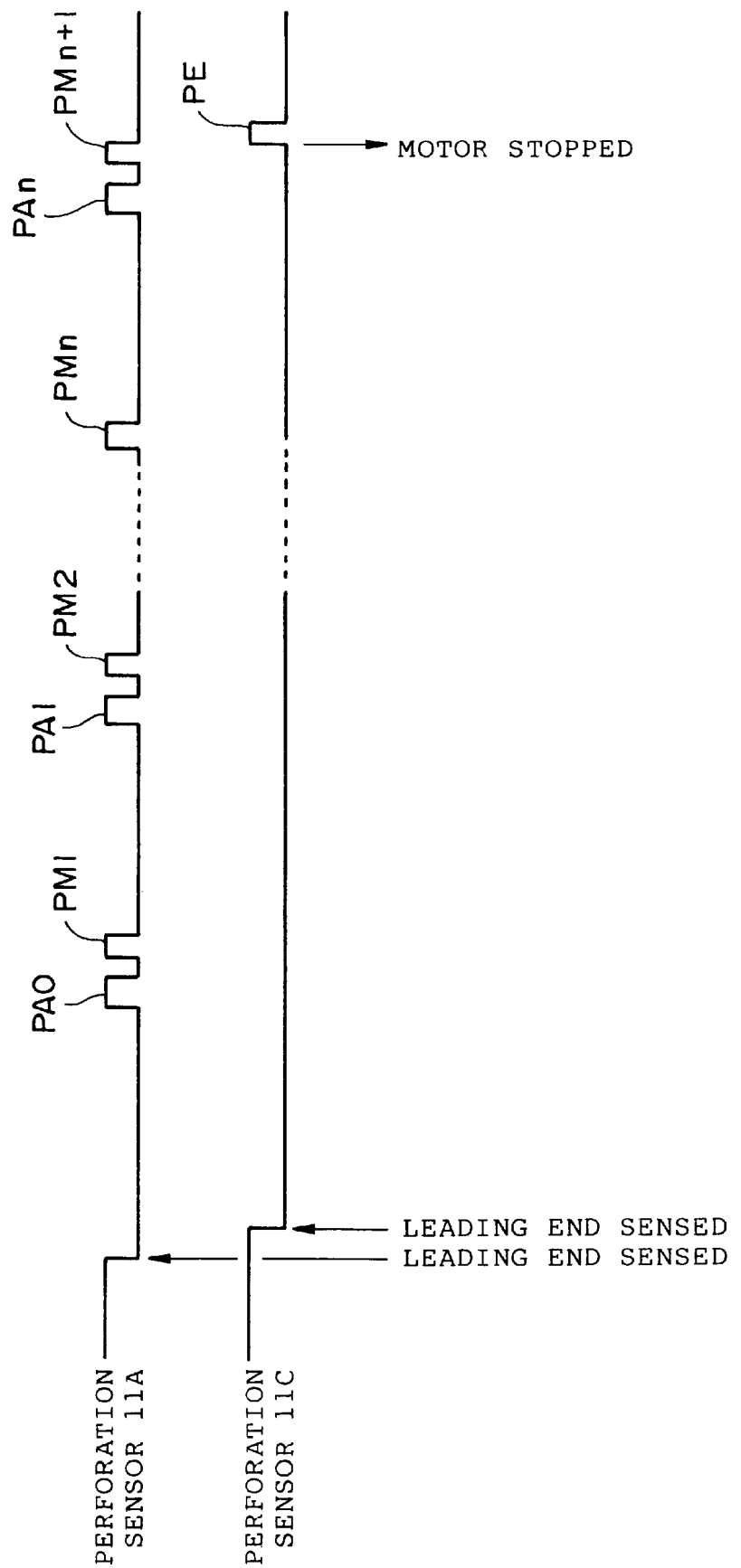
FIG. 16 is a waveform diagram of signals output by perforation sensors with regard to APS film used in the film unit equipped with a lens.
Figure 17A:
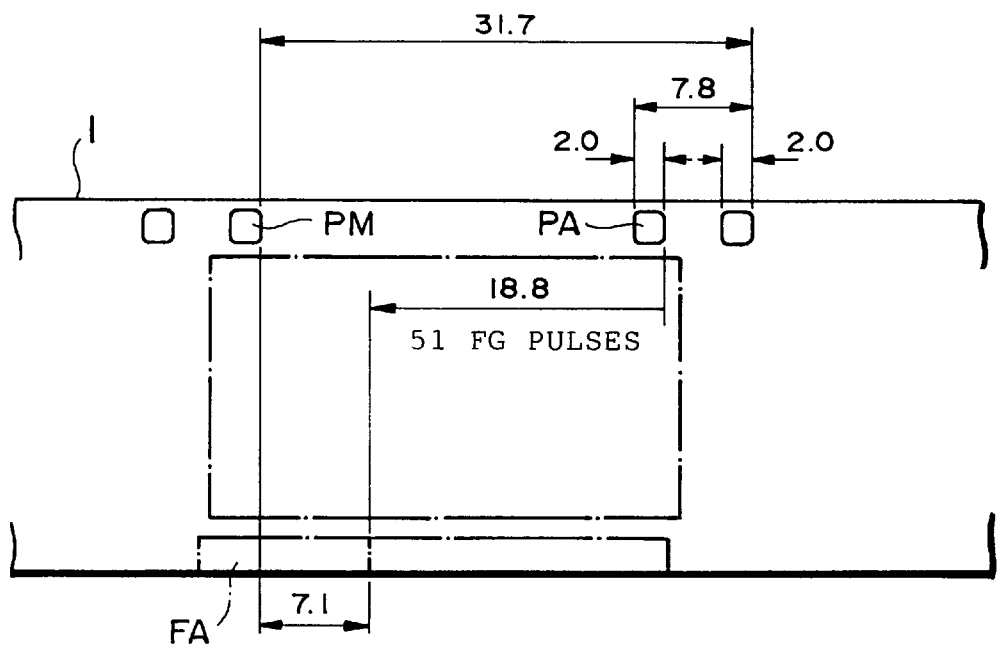
Figure 17B:
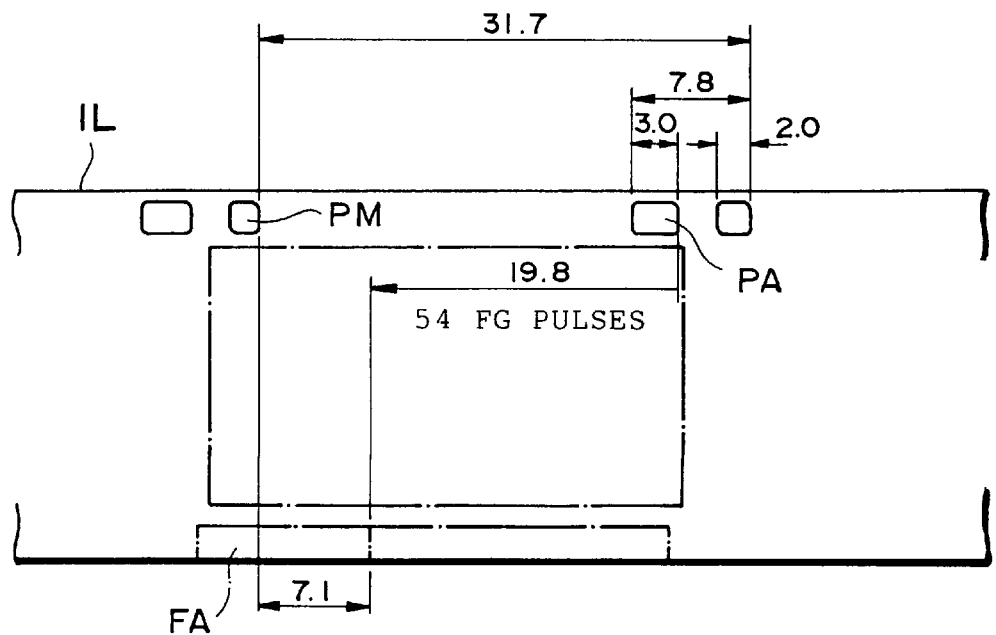

FIG. 15a illustrates the disposition of the perforations of the ordinary APS film 1. This disposition of the perforations is the same as that shown in FIG. 1. FIG. 15b illustrates the disposition of the perforations of an APS film 1L for LF. Similarly, FIG. 17a illustrates the specific dimensions of the ordinary APS film 1 (the dimensions are the same as those shown in FIG. 5 or FIG. 13), and FIG. 17b illustrates the specific dimensions of the APS film 1L for LF. Furthermore, FIG. 16 illustrates the waveforms of signals (compare these with the waveforms shown in FIG. 12) generated by the perforation sensors 11A and 11C when the APS film 1F for LF has been conveyed in the film scanner.

The APS film 1L for LF differs from the ordinary APS film 1 in the following two respects:

In the case of the APS film 1L for LF, one perforation PMn+1 is formed slightly rearward of the perforation PAn, which is rearward of the final frame.

In the case of the APS film 1L for LF, the width of the perforation PA forward of each frame is 1 mm larger (for a total width of 3.0 mm) than the width (2.0 mm) of the perforation PA of the ordinary APS film 1.

The film scanner is capable of identifying the ordinary APS film 1 and the APS film 1L for LF through the following methods: In a first method, the total number of perforations PM and PA on one longitudinal side edge of the APS film is counted during forward conveyance of the film. The film is the ordinary APS film if the total number of perforations is odd and is the APS film for LF if the number of perforations is even. According to a second method, the width of the perforation PA is measured and a threshold is provided between 2.0 mm and 3.0 mm. The film is the ordinary APS film if the measured width has not reached the threshold and is the APS film for LF if the measured width has reached the threshold.

When the film scanner has determined that the film is the APS film for LF, the reading of the FAT bits of the FAT bit area FA in the processing for reading the optical information on the APS film by conveyance thereof in the reverse direction starts after the film has been conveyed 19.8 mm (equivalent to 54 of the FG pulses) in the reverse direction from detection of the trailing edge of the perforation PA [see FIG. 17b]. The remaining part of the operation is the same as that in the case of the ordinary APS film.

A second example of control involves reading the magnetic information and the optical information in the process of conveying the APS film 1 in the forward direction at high speed.

Figure 18:
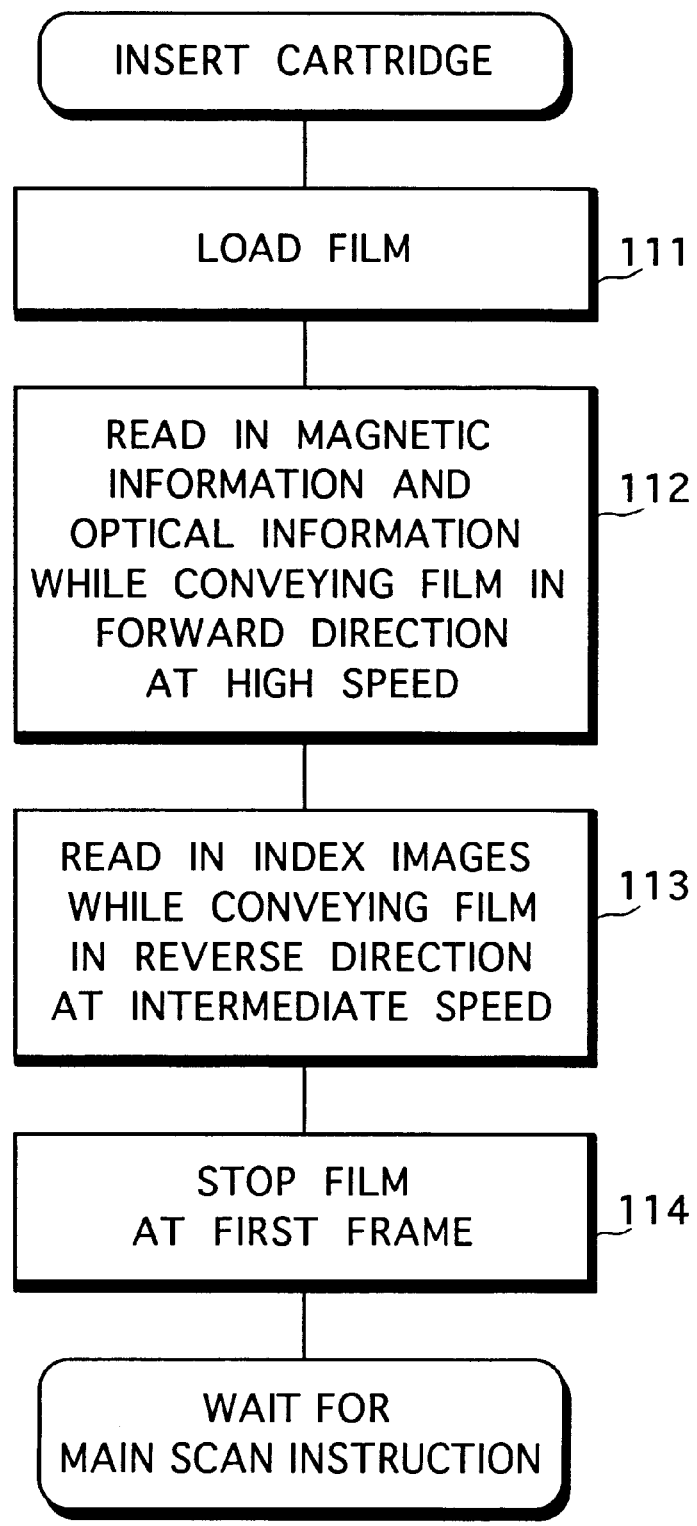
FIG. 18 is a flowchart illustrating the essentials of an operation of a second example in which optical information is read during conveyance in a forward direction.

The essentials of this control operation will now be described with reference to the flowchart of FIG. 18.

When the film cartridge 2 is inserted into the film scanner, the film 1 is loaded (step 111) and is conveyed from its leading end to its trailing end at high speed in the forward direction. At this time the magnetic information that has been recorded in the magnetic information recording areas is read by the magnetic information recording/playback unit 34 using the reading head 14A. In addition, the optical information is read by the optical information reader 33 based upon the output from the photo sensor 12 during this high-speed forward conveyance (step 112).

Next, the images in the exposed image areas AR are read by the CCD line sensor 13, and the resulting video signal is processed by the image signal processor 31, while the film 1 is conveyed at intermediate speed in the reverse direction from its trailing end to the first frame on the side of the leading end. This reading of the images is coarse reading and index images are formed by the video signal obtained. The index images are displayed on the monitor display unit (step 113).

At the moment the reading of images up to the first frame (Frame No. 1) ends, the conveyance of the film 1 is stopped (step 114) and the system waits for a main scan instruction.

As mentioned above, the leader portion of the film forward of the position of the first perforation PA0 has the optical information recording areas, which include the Lot. No. bar-code area RT1, the film ID bar-code area FI1 and the CHOL area CH, as well as the magnetic information recording areas. The precise positions of these recording areas cannot be sensed by the time the perforation PA0 is sensed.

Accordingly, the reading of the information recorded on the leader of the APS film 1 is carried out as set forth below and will be described with regard to the processing for reading the optical information. The reading of the magnetic information is performed at the same time as the reading of the optical information.

Figure 19:
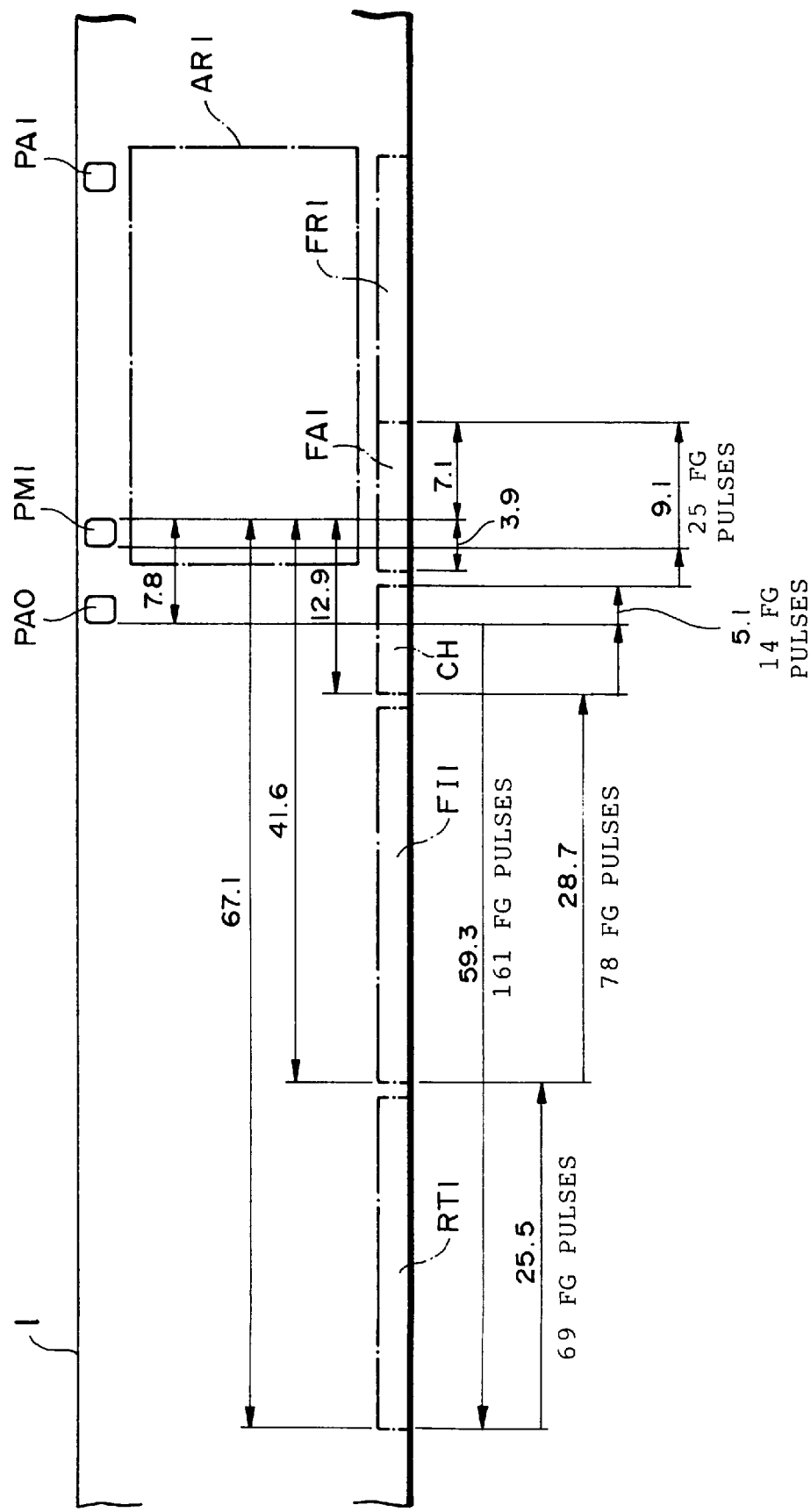
FIGS. 19 through 21 are diagrams useful in describing the timing at which optical information recording areas are read.

The leading end of the APS film 1 is pulled out and the film 1 is conveyed in the forward direction until the leading edge of the first perforation PA0 is sensed by the perforation sensor 11A. See FIG. 19.

When the first perforation PA0 is sensed, the conveyance of the film 1 is stopped and the film is conveyed in the reverse direction by a distance of 59.3 mm, namely by a distance equivalent to 161 of the FG pulses. As a result, the film is positioned such that the photo sensor 12 is situated at the beginning of the Lot. No. bar-code area RT1.

The bar code of the Lot. No. bar-code area RT1 is read while the film 1 is conveyed in the forward direction. As the length of the area RT1 is 25.5 mm, the reading of the area RT1 is finished when the film 1 has been conveyed a distance corresponding to 69 of the FG pulses.

The film 1 continues to be conveyed in the forward direction. Since this results in the photo sensor 12 entering the film ID bar-code area FI1, the bar code of the area FI1 is read. The reading of the area FI1 is finished when the film 1 has been conveyed by a distance equivalent to 78 FG pulses, which corresponds to the length of this area.

The film 1 continues to be conveyed in the forward direction. The reading of the CHOL area CH is carried out next. The leading edge of the perforation PA0 is sensed during the reading of the area CH. The reading of area CH is finished when the film has traveled a distance equivalent to 14 of the FG pulses from detection of the leading edge of perforation PA0.

Next, the reading of the FAT area FA1 of the first frame (No. 1) is performed. The leading edge of the perforation PM1 is sensed during the reading of the FAT area FA1. The reading of the FAT area FA1, therefore, is stopped when the film has traveled a distance equivalent to 25 of the FG pulses from detection of the perforation PM1. The position at which this reading operation stops can be measured from the position of the leading edge of the perforation PA0.

Figure 20:
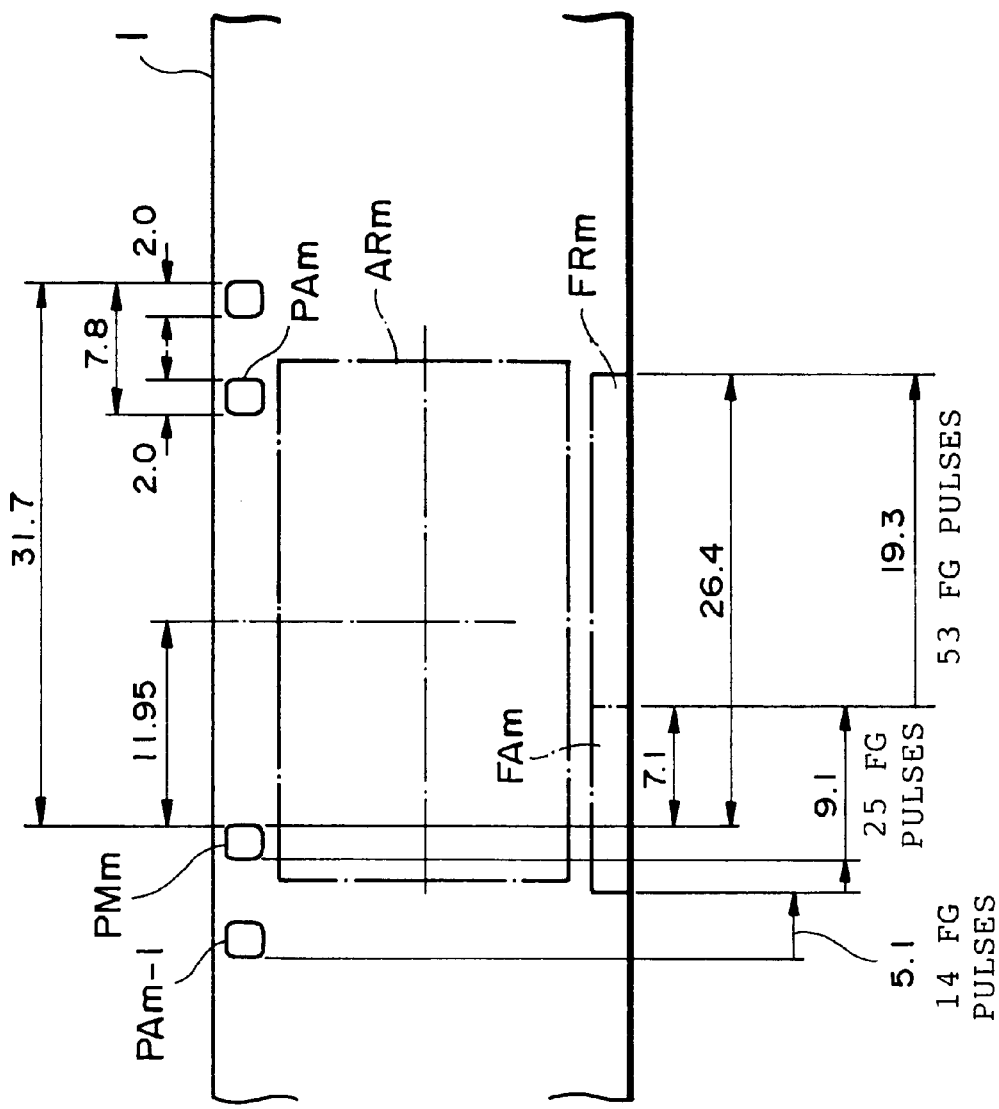

With reference to FIG. 20, the reading of the FAT bit area FAm of each frame (No. m) and of the frame bar-code area FRm is carried out as set forth below. The reading of the FAT bit area FAm is started from the moment the film has been conveyed a distance equivalent to 14 of the FG pulses from detection of the leading edge of the perforation PAm−1 of the frame (No. m−1) preceding this frame (No. m). The reading of the FAT area FAm ends when the film 1 has been conveyed a distance equivalent to 25 of the FG pulses from detection of the leading edge of the perforation PMm, then a transition is made to reading of the frame bar-code area FRm. The frame bar code is read during the time that the film is conveyed a distance equivalent to 53 of the FG pulses, which corresponds to the length of the area FRm.

The reading of the optical information on the trailer of the APS film 1 is carried out in the manner described below.

Figure 21:
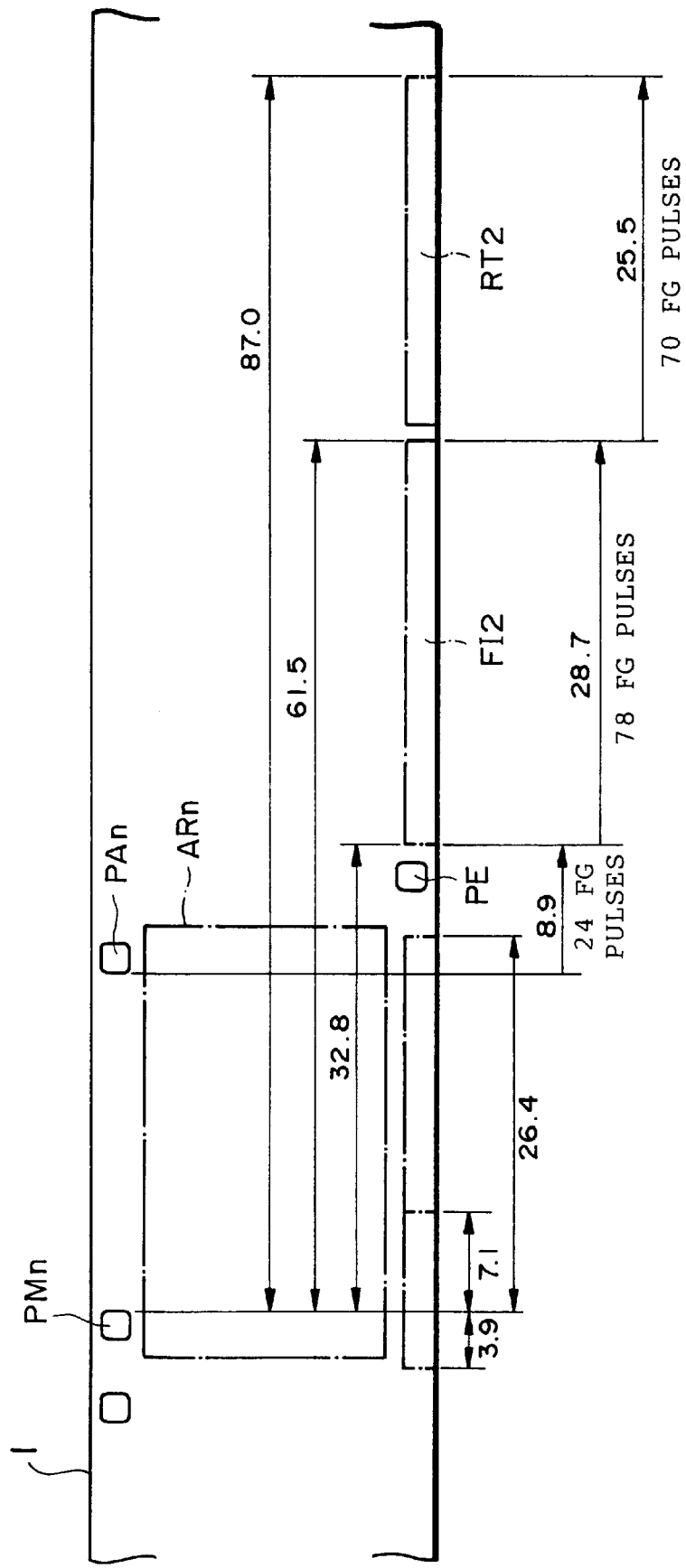

With reference to FIG. 21, the reading of the film ID bar-code area FI2 starts from a position which has been advanced by a distance equivalent to 24 of the FG pulses from detection of the leading edge of the perforation PAn of the final frame (No. n). The reading of this area continues until the film has been conveyed a distance equivalent to 78 of the FG pulses. A transition is then made to reading of the Lot. No. bar-code area RT2, and reading of the area RT2 is halted when 70 of the FG pulses have been generated.

In this reading during conveyance in the forward direction, the detection of the leading edges of the perforations serves as a reference and therefore the reading of the optical information is performed in a manner the same as that described above also in a case where the APS film for LF is read.

When there is a discrepancy, in the conveyance direction, between the position at which the leading edge of a perforation is sensed by the sensor 11A and the position at which the optical information is read by the photo sensor 12, it goes without saying that a pulse count equivalent to this discrepancy and serving as an offset should be added to or subtracted from the count of the FG pulses.

Figure 22:
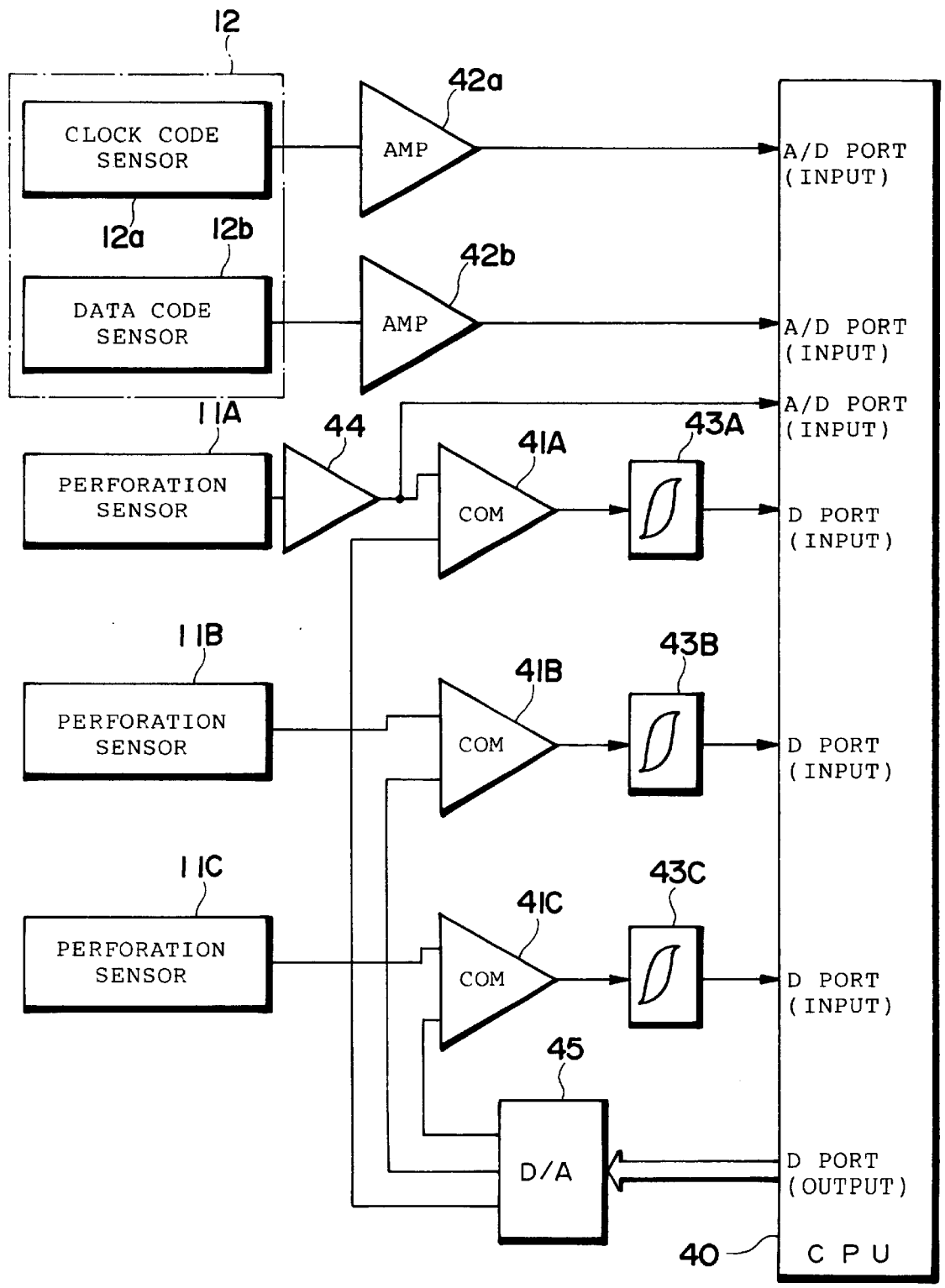
FIG. 22 is a block diagram illustrating a specific example of a circuit for processing signals output by light sensors and perforation sensors.

FIG. 22 illustrates the details of the circuit arrangement of the perforation sensing circuit 32 and optical information reader 33 shown in FIG. 8. Here a CPU 40 is provided and shared by the sensing circuit 32 and reader 33.

Figure 25:
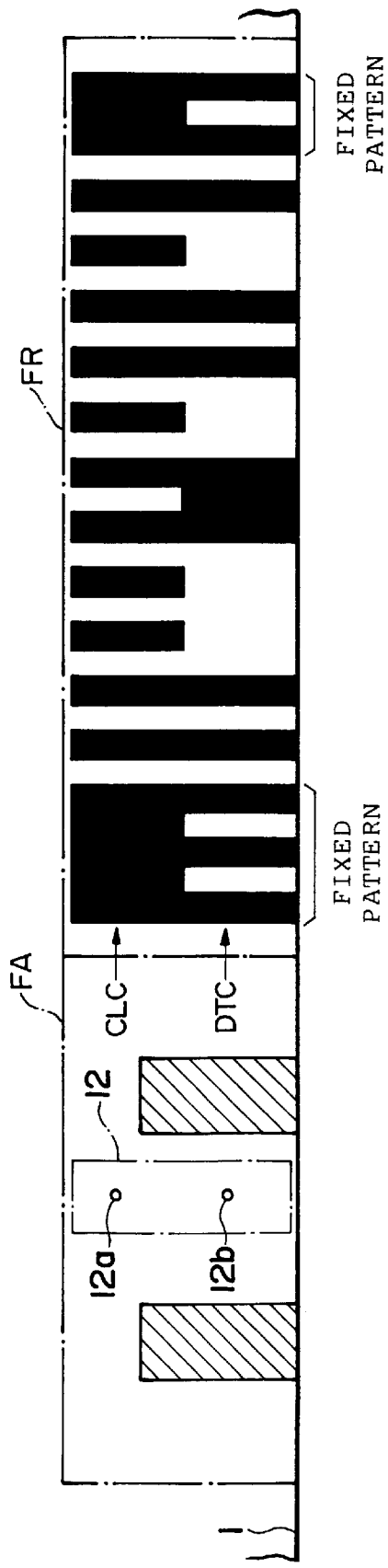
FIG. 25 illustrates a FAT bit area and a frame bar-code area as well as waveforms of signals obtained by reading these areas.
Figure 25:
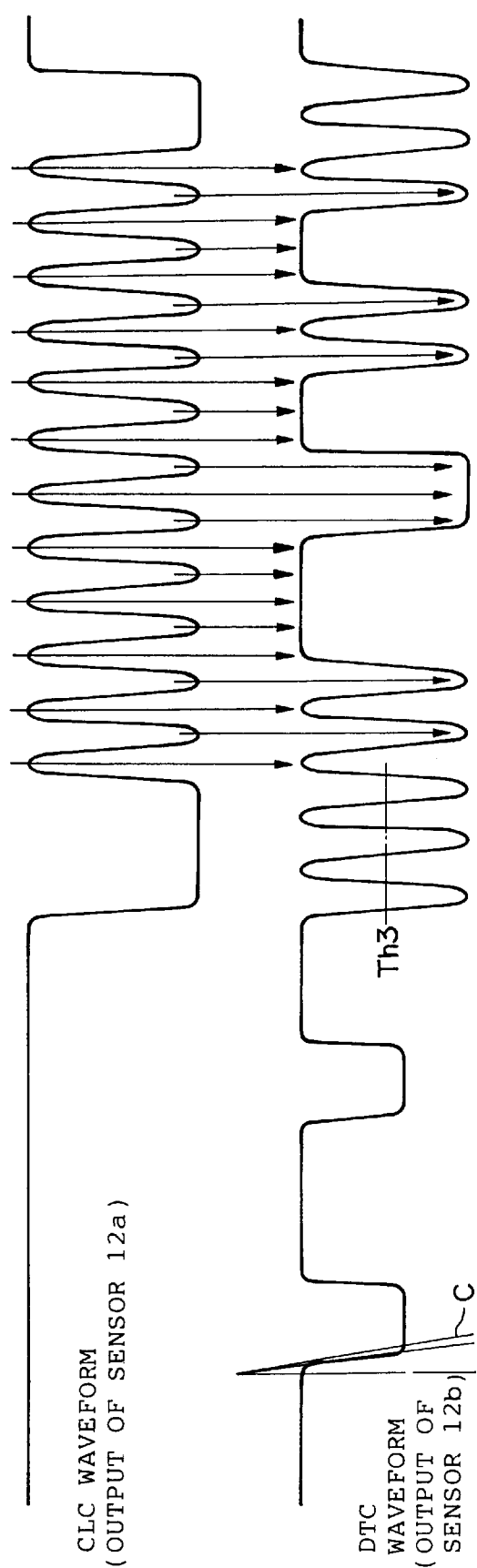

The photo sensor 12 for reading the optical information is equipped with two sensors (light sensing devices or light-emitting elements) 12a and 12b. As shown in FIG. 25, the sensor 12a is situated at a position traversed by the clock code string CLC of the frame bar-code area FR when the APS film 1 is conveyed. The light sensor 12a reads the code string CLC. The light sensor 12b reads the data code string DTC. Signals from the sensors 12a and 12b indicative of light reception are amplified by respective amplifier circuits 42a and 42b and the amplified signals are applied to A/D ports of the CPU 40. The CPU 40 converts these signals to digital data and reads in the digital data at an appropriate sampling period.

The output signal of the perforation sensor 11A is applied to an A/D port of the CPU 40 via a buffer circuit 44. The CPU 40 converts the output signal of the sensor 11A to digital data and reads in the digital data.

The output signal of the perforation sensor 11A also enters a comparator circuit 41A via the buffer circuit 44. Similarly, the output signals of the other perforation sensors 11B and 11C also enter comparator circuits 41B and 41C. Digital data representing a threshold value is applied to a D/A converting circuit 45 by the CPU 40. The D/A converting circuit 45 converts this digital data to an analog voltage and applies this analog voltage to the comparator circuits 41A, 41B and 41C as a reference voltage. The comparators 41A, 41B and 41C compare the output signals of the perforation sensors 11A, 11B and 11C with the reference voltage and, according to this embodiment, each comparator produces an output if the output signal of the corresponding perforation sensor is greater than the reference voltage. The output signals of the comparator circuits 41A, 41B and 41C enter the CPU 40 upon being wave-shaped by Schmitt circuits 43A, 43B and 43C.

The operations for reading the optical information and sensing the perforations by the sensors 12a, 12b and 11A~11C include a large number of distinctive features. These features will now be described in detail. The output signals of each of these various sensors are of a form in which the larger the quantity of light that impinges upon the sensor, the higher the level indicated, and of a form in which the larger the quantity of light that impinges upon the sensor, the lower the level indicated. The description that follows is premised upon the former signal output form.

There are individual differences in the densities of film bases and density differs from one film to another. This holds for all types of photographic films and is not limited to APS film. As a result, the optical transmissivity of the film (the optical reflectivity in a case where detection of perforations and reading of optical information are carried out based upon reflected light) differs depending upon the film. Further, there are instances where the film is soiled or dusty. This means that if the comparator circuits 41A~41C are set to a fixed reference voltage (threshold value), there is the danger that the perforations will not be sensed accurately.

Figure 24:
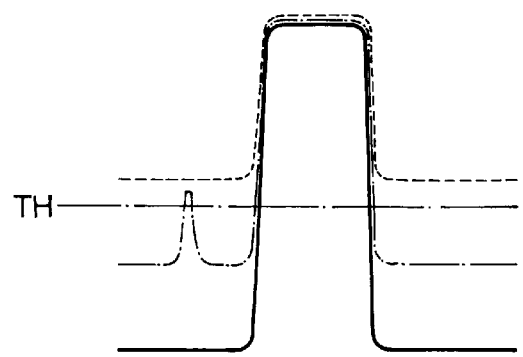
FIG. 24 is a waveform diagram useful in describing the occurrence of erroneous operation caused by a fixed threshold value.

FIG. 24 illustrates the signal waveform output by the sensor 11A, 11B or 11C when a perforation passes by the front of the sensor. Assume that a threshold value TH for level discrimination has been fixedly set on the assumption that a signal waveform indicated by the solid line in FIG. 24 will be obtained. If a signal waveform indicated by the broken line is obtained when a film whose base has a high optical transmissivity is conveyed, the presence of a perforation cannot be sensed using the threshold value TH decided earlier. In case of a signal waveform indicated by the dot-and-dash line for which the optical transmissivity of the film base is between the solid and broken lines and a noise component having a comparatively high level is superposed on the waveform, the noise component will exceed the threshold value TH, resulting in erroneous detection.

Figure 23:
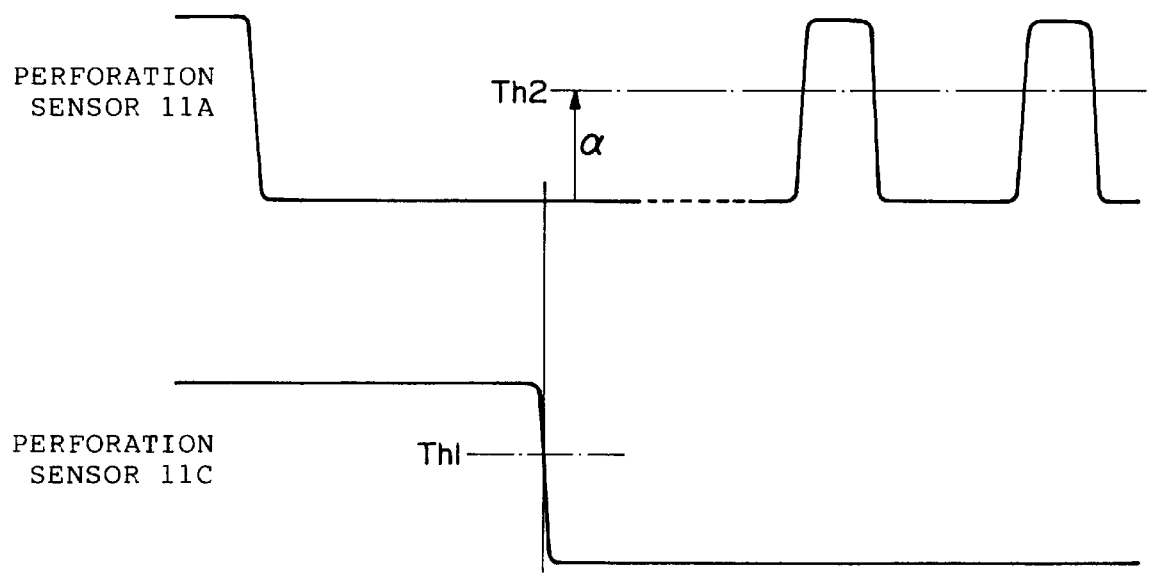
FIG. 23 is a waveform diagram useful in describing a method of deciding a threshold value for discriminating the level of an output signal from a perforation sensor.

Accordingly, in this embodiment, a first feature described next is use of a threshold value which is variable so that perforations can be sensed. With reference to FIG. 23, a suitable initial threshold value Th1 is set for the comparator circuits 41A, 41B and 41C in advance. More specifically, data representing the threshold value Th1 is applied to the D/A converting circuit 45 from the CPU 40, and an analog voltage corresponding to this digital data is supplied from the D/A converting circuit 45 to the comparator circuits 41A, 41B and 41C as a reference voltage.

The leading end of the APS film 1 is sensed successively by the perforation sensors 11A, 11C during forward conveyance of the film. After the leading end of the film is sensed, the levels of the output signals from the sensors 11A, 11C fall.

The conveyance of the film 1 stops temporarily at the moment the level of the output signal from the perforation sensor 11C falls below the initial threshold value Th1. The output signal of the perforation sensor 11A at this time is read in by the CPU 40 via the buffer circuit 44. The light incident upon the perforation sensor 11A is light that has passed through the base of the film 1, and the output signal of the perforation sensor 11A represents the density of the film base. The CPU 40 adds a predetermined level a to the read output level (which shall be referred to as "DC") of the sensor 11A and sets a new threshold level Th2, where Th2=DC+α. The digital data representing the new threshold value Th2 is applied to the D/A converting circuit 45. The later outputs an analog voltage corresponding to the threshold value Th2, this voltage being applied to the comparator circuits 41A~41C. The forward conveyance of the APS film 1 resumes and the sensing of the perforations is performed by discriminating the levels of the output signals from the perforation sensors 11A~11C using the new threshold level Th2.

Thus, the proper threshold level Th2 is set regardless of film base density, soiling of the film or the accumulation of dust, and therefore the perforations are sensed with little likelihood of erroneous detection. In the example described above, a fixed value is used as the level α added to the DC level. However, there are many ways of deciding the threshold level Th2, such as by setting the threshold value Th2 between the base level DC and a level at which the sensor 11A does not sense the film.

A second feature is using the common light source (e.g. a fluorescent lamp) 23 for illuminating the exposed image areas AR and for illuminating the optical information recording areas FA, FR, etc., as mentioned earlier. In FIG. 10 the area traversed by the perforations also is illuminated by the light source 23. Though not shown, the front of the light source 23 is formed to have a lighting hole in order to limit the illumination of the optical information recording areas. The light is blocked at the periphery of the hole. Further, the front of each of the sensors 12a and 12b is formed to have a light-receiving hole the periphery of which blocks light. As a result of this arrangement, light from the light source 23 is received by the sensors 12a, 12b through the lighting hole, the film and the light-receiving hole so that extraneous light impinging upon the sensors 12a, 12b is reduced greatly. The same is true for the sensor 11A which senses the perforations. Cost can be reduced and space conserved by sharing the single light source in this manner.

A third feature is that the sensor 12b is shared as the sensor which reads the FAT bits of the FAT bit areas and as the sensor which reads the data code string DTC of the frame bar-code areas FR. This also makes it possible to lower cost and conserve space. Further, using this shared sensor means that only a single associated input port on the CPU 40 is sufficient as shown in FIG. 22.

Sharing a single sensor as both the sensor for the FAT bits and the sensor for the data code string can be achieved through use of several distinctive techniques. One of these techniques is a fourth feature.

As mentioned above, film conveyance distance is measured and the leading and trailing edges of the FAT bit areas FA and frame bar-code areas FR are recognized by counting the number of FG pulses from the moment the leading edge or trailing edge of a perforation is sensed. Since the areas FA, FR can be determined by the count of the FG pulses, the CPU 40 is capable of making a correct interpretation by recognizing to which areas the codes belong even though the sensor 12b is shared for the reading of the codes (bits) in these areas.

Further, as mentioned above, the bar codes in the frame bar-code areas FR are recorded during the film manufacturing process. In general, therefore, the bar codes appear in the color black after the film is developed. On the other hand, the FAT bits of the FAT bit areas FA are exposed using the light source incorporated in the camera and therefore do not necessarily appear in black after the film is developed; they may appear in another color (green, for instance). Accordingly, since the quantity of light that has passed through a bar code and the quantity of light that has passed through a FAT bit generally differ, so does the level of the output signal from the sensor 12b (see FIG. 25). This means that identical threshold values cannot be used to read the FAT bits and the bar codes. Accordingly, the fourth feature is that different methods are adopted for reading the FAT bits and for reading the bar codes.

When a steep positive- or negative-going transition having a slope in excess of a prescribed slope C appears in the output signal of the sensor 12b in a period of time during which the FAT bit area FA is being read, as shown in FIG. 25, this is construed to mean that the area FA has a FAT bit. The output signal of the sensor 12b is sampled and A/D-converted at a predetermined period. If a level change greater than a predetermined value is sensed in one or a prescribed number of sampling periods, it is judged that a FAT bit is present.

Figure 26:
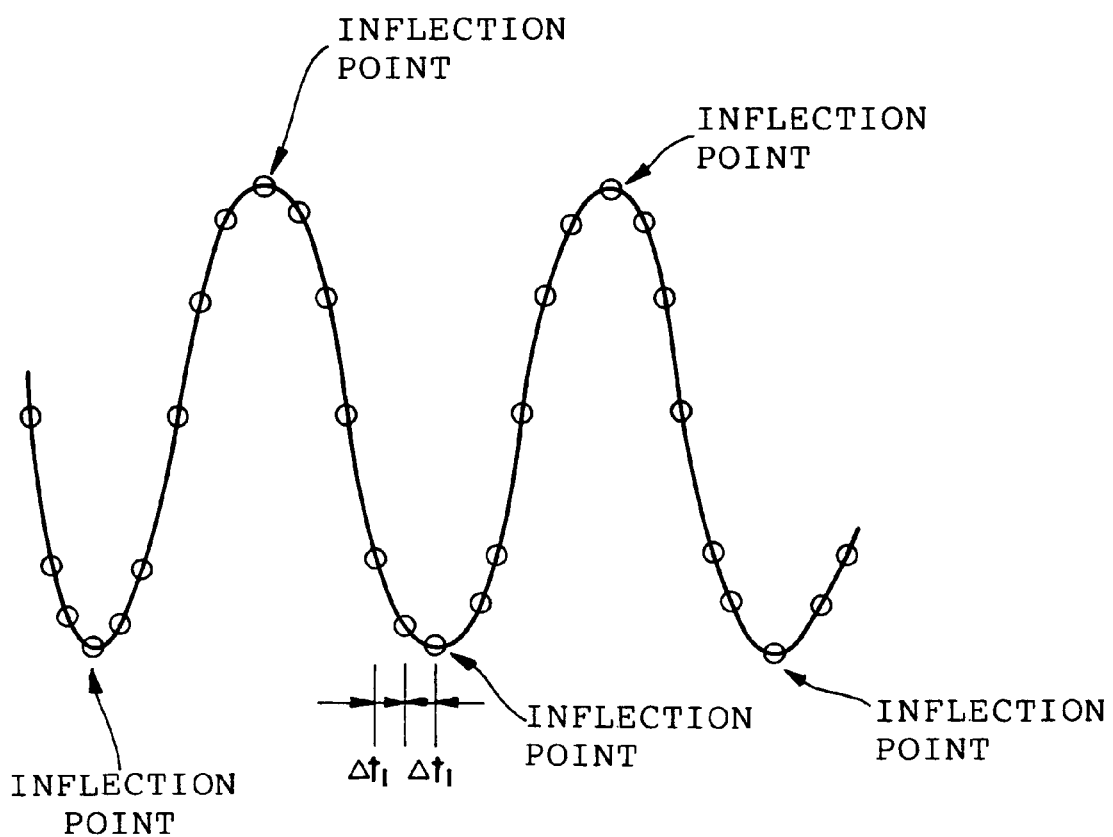
FIG. 26 illustrates the manner in which inflection points are sensed.

The bar code of the frame bar-code area FR is composed of the clock code string CLC and data code string DTC, as mentioned earlier, and the code strings CLC and DTC are read by the sensors 12a and 12b, respectively. The signal obtained by reading the data code string DTC is discriminated using a predetermined threshold value Th3 (described later). Inflection points which appear in the signal obtained by reading the clock code string CLC are sensed in the manner shown FIG. 26. The levels of the signal obtained by reading CLC are compared every sampling period Δt1 and a point at which the change in the level makes a transition from positive to negative or from negative to positive is an inflection point. The data code can be read by judging the discriminated level of the DTC signal at the timing at which the inflection points of the CLC signal are sensed. Since the data code is read at the inflection points of the clock code, accurate reading of the bar codes is possible at a correct timing and without errors being caused by some level fluctuation of the read signals.

The beginning and end of the data code string DTC have fixed patterns of three clocks and two clocks, respectively. The average value of the signal levels from the sensor 12b in the period during which the fixed pattern at the beginning of the code string is read is calculated and this value is set as the threshold value Th3. Since the threshold value Th3 is set based upon the signal level of part of the data code string DTC, it is possible to set a threshold value not influenced by the film base or the like. This is a fifth feature.

It goes without saying that it is possible to read the Lot. No. bar-code areas RT1, RT2, the film ID bar-code areas FI2, FI2 and the CHOL area CH in a similar anner using the sensor 12.

In the example described above, the reading of bar odes and the like is carried out by sensing light that has passed through the film. However, it goes without saying that reading is possible in the same manner based upon light reflected from the film.

As many apparently widely different embodiments of the present invention can be made without departing from the spirit and scope thereof, it is to be understood that the invention is not limited to the specific embodiments thereof except as defined in the appended claims.

What is claimed is:

1. A method of reading optical information in a film scanner executed while a photographic film is conveyed in a direction longitudinally thereof, wherein the photographic film has perforations along a first longitudinal side edge thereof and is provided with optical information recording areas along a second longitudinal side edge thereof, the perforations and the optical information recording areas being made to correspond to an image recording area of each frame of the film, said method comprising:

sensing an edge of a perforation by a perforation sensor;

measuring a conveyance distance of the photographic film using as a reference the sensing of the edge of a perforation that corresponds to a frame or the edge of a perforation that corresponds to a neighboring frame;

starting reading of the optical information by a photo sensor when the conveyance distance has attained a predetermined first value, and ending reading of the optical information when the conveyance distance has attained a second predetermined value;

conveying the photographic film in a forward direction that agrees with a sequence of frame numbers;

conveying the photographic film a prescribed distance in a reverse direction in response to sensing of a perforation that corresponds to a first frame; and subsequently reading the optical information in an optical information recording area provided ahead of the position of the first frame while the photographic film is again conveyed in the forward direction.

2. A method of reading optical information in a film scanner executed while a photographic film is conveyed in a direction longitudinally thereof, wherein the photographic film has perforations along a first longitudinal side edge thereof and is provided with optical information recording areas along a second longitudinal side edge thereof, the perforations and the optical information recording areas being made to correspond to an image recording area of each frame of the film, said method comprising:

sensing an edge of a perforation by a perforation sensor;

measuring a conveyance distance of the photographic film using as a reference the sensing of the edge of a perforation that corresponds to a frame or the edge of a perforation that corresponds to a neighboring frame;

starting reading of the optical information by a photo sensor when the conveyance distance has attained a predetermined first value, and ending reading of the optical information when the conveyance distance has attained a second predetermined value;

conveying the photographic film in a direction which is the reverse of a sequence of frame numbers; and reading the optical information in an optical information recording area provided ahead of the position of a first frame after reading the optical information that corresponds to the first frame.

3. A film scanner for reading images recorded on image recording areas of a photographic film, wherein the photographic film is formed to have perforations along a first longitudinal side edge thereof and is provided with optical information recording areas along a second longitudinal side edge thereof, the perforations and the optical information recording areas being made to correspond to an image recording area of each frame of the film, comprising:

a film conveyance device for conveying the photographic film longitudinally thereof;

a perforation sensor for sensing edges of perforations of the photographic film being conveyed by said film conveyance device;

a photo sensor for outputting a signal having a level that corresponds to information that has been recorded on the optical information recording areas;

distance measuring means for measuring conveyance distance of the photographic film by said film conveyance device; and optical information reading control means responsive to sensing, by said perforation sensor, of the edge of a perforation that corresponds to a frame or the edge of a perforation that corresponds to a neighboring frame for causing said distance measuring means to measure conveyance distance from said edge, and starting acquisition of an output signal from said photo sensor when the conveyance distance measured has attained a first value and ending acquisition of the output signal from said photo sensor when the conveyance distance measured has attained a second value.

4. A film scanner for reading images recorded on image recording areas of a photographic film, wherein the photographic film has perforations along a first longitudinal side edge thereof and is provided with optical information recording areas along a second longitudinal side edge thereof, the perforations and the optical information recording areas being made to correspond to an image recording area of each frame of the film, comprising:

a film conveyance device for conveying the photographic film longitudinally thereof;

a perforation sensor for sensing edges of perforations of the photographic film being conveyed by said film conveyance device;

a photo sensor for outputting a signal having a level that corresponds to information that has been recorded on the optical information recording areas;

distance measuring means for measuring conveyance distance of the photographic film by said film conveyance device;

optical information reading control means responsive to sensing, by said perforation sensor, of the edge of a perforation that corresponds to a frame or the edge of a perforation that corresponds to a neighboring frame for causing said distance measuring means to measure conveyance distance from said edge, and starting acquisition of an output signal from said photo sensor when the conveyance distance measured has attained a first value and ending acquisition of the output signal from said photo sensor when the conveyance distance measured has attained a second value; and conveyance control means for controlling said film conveyance device to so as to convey the photographic film first in a forward direction, then convey the photographic film a prescribed distance in a reverse direction in response to sensing of a perforation that corresponds to a first frame by said perforation sensor, and subsequently convey the photographic film in the forward direction a second time;

said optical information reading control means reading the optical information in an optical information recording area provided ahead of the position of the first frame by acquiring the output signal from said photo sensor during the conveyance of the photographic film in the forward direction by said film conveyance device the second time.

5. A film scanner for reading images recorded on image recording areas of a photographic film, wherein the photographic film has perforations along a first longitudinal side edge thereof and is provided with optical information recording areas along a second longitudinal side edge thereof, the perforations and the optical information recording areas being made to correspond to an image recording area of each frame of the film, comprising:

a film conveyance device for conveying the photographic film longitudinally thereof;

a perforation sensor for sensing edges of perforations of the photographic film being conveyed by said film conveyance device;

a photo sensor for outputting a signal having a level that corresponds to information that has been recorded on the optical information recording areas;

distance measuring means for measuring conveyance distance of the photographic film by said film conveyance device; and optical information reading control means responsive to sensing, by said perforation sensor, of the edge of a perforation that corresponds to a frame or the edge of a perforation that corresponds to a neighboring frame for causing said distance measuring means to measure conveyance distance from said edge, and starting acquisition of an output signal from said photo sensor when the conveyance distance measured has attained a first value and ending acquisition of the output signal from said photo sensor when the conveyance distance measured has attained a second value; and conveyance control means for controlling said film conveyance device to so as to convey the photographic film in a forward direction up to a first frame and then conveying the photographic film in a reverse direction;

said optical information reading control means reading the optical information in an optical recording area ahead of the position of the first frame by acquiring the output signal from said photo sensor after reading the optical information that corresponds to the first frame during conveyance of the photographic film in the reverse direction by said film conveyance device.

6. A film scanner for reading images recorded on image recording areas of a photographic film having perforations along a first longitudinal side edge thereof so as to correspond to image recording areas of respective frames of the film, comprising:

a film conveyance device for conveying the photographic film longitudinally thereof;

a perforation sensor provided at a position traversed by the perforations of the photographic film conveyed by said film conveyance device;

means for sensing that the photographic film has been conveyed to such a position that said perforation sensor comes face to face with a film base on a distal end of the photographic film; and means for setting a threshold value, which is for sensing perforations, based upon the level of a signal output by said perforation sensor which is face to face with the film base.

7. A film scanner for reading images recorded on image recording areas of a photographic film a first longitudinal side edge whereof is provided with optical information recording areas, each of which includes a prescribed pattern provided at a prescribed position, so as to correspond to image recording areas of respective frames of the film, comprising:

a film conveyance device for conveying the photographic film longitudinally thereof;

a photo sensor provided at a position traversed by the optical information recording areas of the photographic film conveyed by said film conveyance device;

means for setting a threshold value based upon the level of a signal output by said photo sensor when the prescribed pattern is scanned by said photo sensor, said threshold value being for the purpose of discriminating the level of a signal obtained from another portion of the optical information; and means for discriminating the level of the output signal of said photo sensor by the threshold value set by said means for setting the threshold value.

8. A film scanner for reading images recorded on image recording areas of a photographic film a first longitudinal side edge whereof is provided with optical information recording areas, each of which includes a clock code string and a data code string, so as to correspond to image recording areas of respective frames of the film, comprising:

a film conveyance device for conveying the photographic film longitudinally thereof;

first and second optical sensors provided at positions traversed by the clock code string and data code string, respectively, of the optical information recording areas of the photographic film conveyed by said film conveyance device;

means for sensing inflection points of an output signal of said first optical sensor which scans the clock code string; and means for reading, at the timing of the sensed inflection points, the level of the output signal of said second optical sensor which scans the data code string.

9. A method of reading optical information, magnetic information and an image in a film scanner, wherein a photographic film has perforations along a first longitudinal side edge thereof and is provided with optical information recording areas and magnetic information recording areas along a second longitudinal side edge thereof, the perforations and the optical information recording areas and the magnetic information recording areas being made to correspond to an image recording area of each frame of the film, comprising:

conveying the photographic film in a forward direction up to a final frame at a first speed, sensing an edge of a perforation by a perforation sensor and reading the magnetic information by a magnetic reader, and conveying the photographic film in a reverse direction up to a first frame at a second speed lower than the first speed, sensing an edge of a perforation by the perforation sensor, reading the optical information by a photo sensor and reading an image of the image recording area of each frame by an image reading sensor, obtained image data being used to create index images.

10. A film scanner for reading images recorded on image recording areas of a photographic film, wherein the photographic film has perforations along a first longitudinal side edge thereof and is provided with optical information recording areas and magnetic information recording areas along a second longitudinal side edge thereof, the perforations and the optical information recording areas and the magnetic information recording areas being made to correspond to an image recording area of each frame of the film, comprising:

a film conveyance device for conveying the photographic film longitudinally thereof;

a perforation sensor for sensing edge of perforations of the photographic film being conveyed by said film conveyance device;

a photo sensor for outputting a signal having a level that corresponds to information that has been recorded on the optical information recording area;

a magnetic reader for outputting a signal representing data recorded on the magnetic recording area;

an image reading sensor for reading the image recording area and outputting a signal representing the read image; and control means for controlling said film conveyance device such that first the photographic film is conveyed in a forward direction up to a final frame at a first speed so as to read the magnetic information by said magnetic reader, and second the photographic film is conveyed in a reverse direction up to a first frame at a second speed lower than the first speed so as to read the optical information by said photo sensor and read the image of the image recording area of each frame by said image reading sensor, obtained image data being used to create index images.

11. A method of reading optical information and an image in a film scanner, wherein a photographic film has perforations along a first longitudinal side edge thereof and is provided with optical information recording areas along a second longitudinal side edge thereof, the perforations and the optical information recording areas being made to correspond to an image recording area of each frame of the film, comprising the following steps executed while the photographic film is conveyed in a direction longitudinally thereof, the method comprising:

illuminating a portion of a conveyance path of the photographic film, where the image recording areas and the optical information recording areas of the photographic film pass, by a single light source;

sensing an edge of a perforation by a perforation sensor; and reading the optical information by a photo sensor or reading the image of the image recording area by an image reading sensor at timing determined on the basis of the sense of the edge of the perforation.

12. A film scanner for reading images recorded on image recording areas of a photographic film, wherein the photographic film has perforations along a first longitudinal side edge thereof and is provided with optical information recording areas along a second longitudinal side edge thereof, the perforations and the optical information recording areas being made to correspond to an image recording area of each frame of the film, comprising:

a film conveyance device for conveying the photographic film longitudinally thereof;

a light source for simultaneously illuminating a portion where an image recording area and optical information recording area of the photographic film pass;

a perforation sensor for sensing edge of perforations of the photographic film being conveyed by said film conveyance device;

a photo sensor for outputting a signal having a level that corresponds to information that has been recorded on the optical information recording area;

an image reading sensor for reading the image recording area and outputting a signal representing the read image; and control means for controlling timing when acquisition of an output signal from said photo sensor or acquisition of an output signal from said image reading sensor on the basis of an output signal from said perforation sensor.

13. A method of reading optical information and an image in a film scanner, wherein a photographic film has perforations along a first longitudinal side edge thereof and is provided with optical information recording areas along a second longitudinal side edge thereof, the perforations and the optical information recording areas being made to correspond to an image recording area of each frame of the film, comprising the steps of:

sensing an edge of a perforation by a perforation sensor, pulling the photographic film from a cartridge and conveying the film in a forward direction up to a final frame;

conveying the photographic film in a reverse direction up to a first frame;

reading an image of the image recording area of each frame by an image reading sensor and sensing an edge of a perforation by the perforation sensor during conveyance of the film in the reverse direction; and reading optical information by a photo sensor during conveyance of the film in the forward or reverse direction.

14. A film scanner for reading optical information and an image in a film scanner, wherein a photographic film is formed to have perforations along a first longitudinal side edge thereof and is provided with optical information recording areas along a second longitudinal side edge thereof, the perforations and the optical information recording areas being made to correspond to an image recording area of each frame of the film, the film scanner comprising:

a perforation sensor for sensing an edge of a perforation;

a film conveyance device for pulling the photographic film from a cartridge and conveying the film in a forward direction up to a final frame and for conveying the photographic film in a reverse direction up to a first frame;

an image reading sensor for reading an image of the image recording area of each frame and sensing an edge of a perforation during conveyance of the film in the reverse direction; and a photo sensor for reading optical information during conveyance of the film in the forward or reverse direction.

15. A method of reading optical information and an image on a photographic film, comprising the steps of:

sensing an edge of a first perforation on the photographic film, pulling the photographic film from a cartridge and conveying the photographic film in a forward direction up to a final frame;

conveying the photographic film in a reverse direction up to a first frame;

reading an image of a frame and sensing an edge of a second perforation during conveyance of the film in the reverse direction; and reading the optical information during conveyance of the film in the forward or reverse direction.

16. A film scanner for reading optical information and an image on a photographic film, the film scanner comprising:

a perforation sensor for sensing an edge of a first perforation on the photographic film;

a film conveyance device for pulling the photographic film from a cartridge and conveying the film in a forward direction up to a final frame and for conveying the photographic film in a reverse direction up to a first frame;

an image reading sensor for reading an image of a frame and sensing an edge of a second perforation during conveyance of the film in the reverse direction; and a photo sensor for reading the optical information during conveyance of the film in the forward or reverse direction.

* * * * *